US008436768B2

(12) United States Patent
Bull et al.

(10) Patent No.: US 8,436,768 B2
(45) Date of Patent: May 7, 2013

(54) DIVERSITY TIME AND FREQUENCY LOCATION RECEIVER

(75) Inventors: Jeffrey F. Bull, Chalfont, PA (US); Benjamin H. Cohen, Malvern, PA (US); Adam W. Norgaard, Mount Joy, PA (US)

(73) Assignee: TruePosition, Inc., Berwyn, PA (US)

( * ) Notice: Subject to any disclaimer, the term of this patent is extended or adjusted under 35 U.S.C. 154(b) by 956 days.

(21) Appl. No.: 12/509,391

(22) Filed: Jul. 24, 2009

(65) Prior Publication Data

US 2012/0256789 A1    Oct. 11, 2012

Related U.S. Application Data

(63) Continuation-in-part of application No. 12/346,598, filed on Dec. 30, 2008, now Pat. No. 8,138,975.

(51) Int. Cl.
*G01S 19/42* (2010.01)

(52) U.S. Cl.
USPC ..................................................... 342/357.25

(58) Field of Classification Search ............... 342/357.25
See application file for complete search history.

(56) References Cited

U.S. PATENT DOCUMENTS

| | | |
|---|---|---|
| 4,728,959 A | 3/1988 | Maloney et al. |
| 5,327,144 A | 7/1994 | Stilp et al. |
| 5,510,801 A | 4/1996 | Engelbrecht et al. |
| 5,828,336 A | 10/1998 | Yunck et al. |
| 5,936,571 A | 8/1999 | Desjardins |
| 6,047,192 A | 4/2000 | Maloney et al. |
| 6,108,555 A | 8/2000 | Maloney et al. |
| 6,119,013 A | 9/2000 | Maloney et al. |
| 6,351,235 B1 | 2/2002 | Stilp |
| 6,559,800 B2 | 5/2003 | Rabinowitz et al. |
| 6,876,859 B2 | 4/2005 | Anderson et al. |
| 6,879,286 B2 | 4/2005 | Rabinowitz et al. |
| 6,917,328 B2 | 7/2005 | Rabinowitz et al. |

(Continued)

FOREIGN PATENT DOCUMENTS

EP    1051053    11/2000

OTHER PUBLICATIONS

Scott, "J911: Fast Jammer Detection and Location Using Cell-Phone Crowd-Sourcings", GPS World, Nov. 2010, 32-36.
PCT Application No. PCT/US2009/067772: International Search Report and Written Opinion dated Feb. 25, 2010.
Drucker, E., "On the same day that U.S. citizens elected a new president, the FCC voted in "white spaces"," Wireless Week, Dec. 1, 2008, 1 page.

(Continued)

*Primary Examiner* — Harry Liu
(74) *Attorney, Agent, or Firm* — Woodcock Washburn LLP

(57) ABSTRACT

A Wide Area Sensor Network is disclosed that utilizes wideband software defined radios (SDRs) to provide a capability to monitor the airwaves over a wide frequency range, detect when critical frequencies are being jammed or otherwise interfered with, and locate the source of the interference so that the interference can be eliminated. In addition, a diversity receiver is disclosed. The diversity receiver generates position, time and frequency references for use in locating and synchronizing sensor platforms of a WLS. In an illustrative embodiment, the diversity receiver comprises a first receiver subsystem comprising a terrestrial broadcast receiver, and a common processor platform (CPP) coupled via first link means to the first receiver subsystem. The first receiver subsystem provides a stable time reference and position information to the CPP via the first link means. In addition, the diversity receiver includes second link means for coupling the diversity receiver to a sensor platform and providing time and frequency references and location data to the sensor platform.

21 Claims, 14 Drawing Sheets

U.S. PATENT DOCUMENTS

| | | |
|---|---|---|
| 7,026,987 B2 | 4/2006 | Lokshin et al. |
| 7,345,627 B2 | 3/2008 | Zimmerman et al. |
| 7,388,541 B1 | 6/2008 | Yang |
| 7,471,236 B1 | 12/2008 | Pitt et al. |
| 7,551,126 B2 | 6/2009 | Loomis et al. |
| 2007/0085732 A1 | 4/2007 | Van Diggelen |
| 2007/0161385 A1 | 7/2007 | Anderson |
| 2007/0257831 A1 | 11/2007 | Mathews et al. |
| 2008/0220749 A1 | 9/2008 | Pridmore et al. |
| 2008/0252518 A1* | 10/2008 | Yeshayahu ............... 342/357.02 |
| 2009/0092114 A1 | 4/2009 | Feher |
| 2009/0143018 A1 | 6/2009 | Anderson et al. |

OTHER PUBLICATIONS

Allen, M., "TeleCommunication Systems, Inc. Awarded U.S. Patent for Cellular-Augmented Radar and Laser Detection Technology," Press Release, TeleCommunication System, Inc., Dec. 30, 2008, p. 1-3.

U.S. Appl. No. 12/346,598, filed Dec. 30, 2008, Bull et al.

PCT Application No. PCT/US2010/037709: International Search Report and Written Opinion dated Aug. 10, 2010.

* cited by examiner

DIVERSITY TIME AND FREQUENCY LOCATION RECEIVER

CROSS REFERENCE

This application is a continuation-in-part of U.S. application Ser. No. 12/346,598, entitled "Interference Detection, Characterization and Location in a Wireless Communications or Broadcast System," filed Dec. 30, 2008, which is hereby incorporated by reference in its entirety.

TECHNICAL FIELD

One aspect of the present application generally relates to the detection and location of interfering transmitters within the geographic coverage area of a wireless communications and broadcast networks, particularly using a network-based wireless location system (WLS). In addition, the present application describes an improvement of the diversity timing receiver shown in FIG. 4 of this and the above-cited application Ser. No. 12/346,598, including use of the diversity receiver for both timing and location generation.

BACKGROUND

The characterization of a radio signal in the presence of noise is a classic radio problem. Commonly called "co-channel" or "adjacent channel" interference, spurious signals are considered part of the radio noise that a receiver must deal with in the course of normal operation.

As the use of wireless communications has increased from traditional radio and television broadcasts to two-way terrestrial and satellite wireless communications, the value of radio transmissions has increased. And as the value of radio transmissions has increased, the problem of intentional interference, such as denial of service attacks, have also increased.

Detection of an interfering radio signal and characterization of the interfering signal is well known in the art. Geolocation techniques have been created suitable to wide area deployment, mostly under the auspices of the United States (US) Federal Communications Commission (FCC) Enhanced 9-1-1 mandate. For example, several experiments were conducted during several months of 1995 and 1996 in the cities of Philadelphia and Baltimore to verify the system's ability to mitigate multipath in large urban environments. In 1996, TruePosition constructed the first commercial system in Houston Tex. that was used to test the technology's effectiveness in that area and its ability to interface directly with E9-1-1 systems. In 1997, the location system was tested in a 350 square mile area in the State of New Jersey and was used to locate real 9-1-1 calls from real people in trouble.

The following is an overview of network-based geo-location techniques applicable to locating generic interfering radio signals over a wide area.

Geolocation Techniques

Geolocation is the process of determining the source of a radio frequency (RF) signal by exploiting the characteristics of radio wave propagation. As radio waves propagate from their point of origin, the waves emanate as spherical waves in all directions. The waves exhibit a time delay because they travel at a fixed speed and with an apparent reduction in power because of spherical spreading. Thus, at a point of reception that is fixed with respect to a fixed point of origin, an RF signal appears to originate from a specific direction, exhibit a time delay that is proportional to the distance between the point of origin and point of reception, and reduced in power by an amount proportional to the distance between the point of origin and point of reception.

Geolocation techniques that exploit time delays are known as Time-of-Arrival (TOA) and Time-Difference-of-Arrival (TDOA) techniques. Geolocation techniques that exploit the change in power of radio wave characteristics are know as Power-of-Arrival (POA) and Power-Difference-of-Arrival (PDOA) techniques. Angle-of-Arrival (AoA) geolocation techniques measure the direction from which a source of RF appears to originate. Radio waves also experience an apparent change in frequency as a result of the Doppler effect when the source is moving or the sensor receiving the source is moving. The amount of frequency shift is dependent upon the center frequency of the source as well as the relative velocity between the source and receiving sensor. Geolocation techniques that exploit this characteristic of RF signal propagation are known as Frequency-Difference-of-Arrival (FDOA) techniques.

Each geolocation technique provides different levels of performance in terms of location accuracy and impose different requirements on the sensors (i.e. software defined radios (SDRs)) in a Wide Area Sensor Network (WASN). A key benefit of the WASN is a sensor platform that is calibrated in power and synchronized in time and frequency to permit the exploitation of all of the characteristics of radio wave propagation to determine the origins of RF signals. The multichannel RF to IF stage of the SDR permits the SDR to utilize a direction finding antenna array to determine the AoA of incident RF energy. Each approach can be utilized separately or combined with other techniques, i.e. hybrid geolocation.

Time-of-Arrival (TOA) Based Geolocation:

Network-based TOA location uses the relative time of arrival of a radio broadcast at the network-based receivers. This technique requires that the distance between individual receiver sites (SDRs) and any differences in individual receiver timing be known (cabling delays, differences in SDR designs or radio group delay). The radio signal time-of-arrival can then be normalized at the receiver site, leaving only the time-of-flight between the device and each receiver. Since radio signals travel with a known velocity, the distance can be calculated from derived, normalized time-of-arrivals at the receivers. Time-of-arrival data collected from three or more receivers may be used to resolve the precise position.

Time-Difference-of-Arrival (TDOA) Based Geolocation:

TDOA is the most accurate and useful time-based geolocation technique for emitters that are not cooperative. TDOA requires close time synchronization between the SDRs in the WASN. When two sensors receive a RF signal simultaneously and the time delay between these two received signals is determined, it is well known that a hyperbola, with the two sensors at its foci, describes the potential locations of the originating signal. Adding a third sensor, again time synchronized with the other two and receiving the same signal simultaneously, provides another hyperbola. The intersection of these two hyperbola reveals a unique location as the source of the RF energy. Adding even more sensors yields a greater location accuracy with an over determined solution. TDOA location accuracy depends upon the bandwidth of the signal being located as well as a number of other factors such as integration time and signal-to-noise ratio. Additional detail on using TDOA to locate transmitters (e.g., mobile phones) can be found in commonly assigned U.S. Pat. No. 5,327,144—"Cellular telephone location system" and U.S. Pat. No. 6,047,192—"Robust, efficient, localization system."

Additional details on using TDOA hybrids to locate transmitters (e.g., mobile phones) can be found in commonly assigned U.S. Pat. No. 6,108,555—"Enhanced time difference localization system" and U.S. Pat. No. 6,119,013—"Enhanced time-difference localization system."

Angle-of-Arrival (AoA) Based Geolocation:

The SDRs of the WASN possess multichannel phase and frequency coherent circuitry, permitting the use of phase interferometric antenna arrays to be used to determine the angle-of-arrival (AoA) of RF signals. In effect, the AoA points to the direction from which the RF energy originated. A unique location can be estimated by determining the AoA at two or more geometrically separated sites. The unique location is represented by the intersection of the two or more lines of bearing. AoA does not require fine time or frequency synchronization between the sites and providing AoA information to the system controller/central processor. Furthermore, AoA accuracy is not dependent upon the bandwidth of the emitter as with UTDOA, providing the capability to geolocate on narrowband signals. Additional detail on using AoA to locate transmitters (mobile phones) can be found in commonly assigned U.S. Pat. No. 4,728,959—"Direction finding localization system." Additional detail on using AoA/TDOA hybrids to locate transmitters (mobile phones) can be found in commonly assigned U.S. Pat. No. 6,119,013—"Enhanced time-difference localization system."

Power-Of-Arrival (POA) and Power-Difference-Of-Arrival (PDOA) Based Geolocation:

An approximate location of an emitter may be determined by measuring its power at various locations. Measurement can be performed simultaneously with multiple sensors or in a time multiplexed fashion by moving a single sensor to several locations for emitters that transmit a constant power for a significant length of time. Power based geolocation techniques do not have as stringent time and frequency synchronization requirements as the other geolocation techniques discussed above. However, fast fading and shadow fading may limit the accuracy of this method.

Since the power of a radio signal decreases with distance as a result of attenuation of radio waves by the atmosphere and the combined effects of free space loss, plane earth loss, and diffraction losses, an estimate of the distance can be determined from the received signal. In simplest terms, as the distance between transmitter and receiver increases, the radiated radio energy is modeled as if spread over the surface of a sphere. This spherical model means that the radio power at the receiver is decreased by at least the square of the distance.

POA

Power of arrival is a proximity measurement used between a single network node (the SDR) and transmitter. POA location uses the relative power of arrival of a radio broadcast at the network-based SDRs.

Using signal propagation modeling and historical calibration data, the radio signal power-of-arrival can be normalized at the receiver site, leaving only the path-loss between the device and each receiver. Power-of-arrival data collected from three or more receivers can be used to resolve an approximate position.

PDOA

PDOA uses the absolute differences in received radio power at multiple receivers to compute a position. PDOA location techniques require that receiver locations be known a priori. Signal propagation modeling and/or historical calibration data can be used to improve the location estimate. Power data collected from three of more receivers using a common time-base can be used to resolve an approximate position.

Frequency-Difference-Of-Arrival (FDOA)

Using FDOA to determine an approximate location of an emitter is performed by measuring the signal's frequency at various locations. Measurement is performed simultaneously with multiple sensors or in a time multiplexed fashion by moving a single sensor to several locations for emitters that transmit for a significant length of time.

Frequency-Difference-of-Arrival uses measurement of signal frequency offsets as received at multiple receivers. Due to the differing Doppler-induced frequency offsets, FDOA provides speed and heading of moving transmitters. To use FDOA for location estimation, either or both the transmitter or receiver(s) must be in motion.

Since both the FDOA and TDOA techniques require a precise timing source (common clock and a common frequency reference), both techniques can be used simultaneously for localization as described in commonly assigned U.S. Pat. No. 6,876,859—"Method for estimating TDOA and FDOA in a wireless location system."

Hybrid Geolocation Techniques:

All the described location techniques can be used for the localization of an emitter by using techniques such as a Weighted Least Squares or Constrained Least Squares algorithm which allows the additive probability of each location technique to render a best location estimate for the technique or mix of techniques used.

The great dependence of a modern society upon wireless systems creates vulnerabilities to disruption of the wireless systems. Wireless equipment is relatively unprotected to disruption by jamming and interference whether inadvertent or intentional. A system that is capable of being deployed over a wide area that detects, classifies and locates wireless signals would be useful for monitoring the airwaves for interference to critical wireless signals. It would be advantageous to use one or more of the above geolocation techniques in a Wide Area Sensor Network to identify and locate intentional and unintentional sources of interference over a geographic area of interest.

In addition, another problem addressed by the solutions described herein relates to the need for improved methods and systems for determining an accurate position of one or more location sensors of a WLS. In particular, geolocation with TOA or TDOA techniques with a network of sensors requires that the location of the sensors (also known as Positioning Determining Entities (PDEs), Signal Collection Systems (SCSs) or Location Measurement Units (LMUs)) be known and that the sensors be tightly synchronized with each other in time. Frequency-Difference-of-Arrival (FDOA) geolocation techniques with a network of sensors require the sensor locations to be known and that the sensors be tightly synchronized with each other in frequency. Utilizing GNSS receivers in the static sensors provides a convenient way to determine the locations of the sensors as well as to achieve a high level of time and frequency synchronization performance. However, GNSS receivers can only provide this level of location and synchronization performance when they have an unobstructed view of the sky. In many operational deployment scenarios, a clear view of the sky, or even a view of a significant fraction of the sky, is not feasible. Therefore, it would be advantageous to include a hybrid or fallback technique into the sensor platform for determining the sensor's position as well as synchronizing to the other sensors in the WLS in time and frequency, in effect, providing diversity for synchronizing the sensors and determining their location.

SUMMARY

The following summary provides an overview of various aspects of exemplary embodiments of the present disclosure.

This summary is not intended to provide an exhaustive description of all of the important aspects of the disclosed subject matter, or to define the scope of the disclosure. Rather, this summary is intended to serve as an introduction to the following description of illustrative embodiments.

A Wide Area Sensor Network is disclosed that utilizes wideband software defined radios (SDRs) to provide a capability to monitor the airwaves over a wide frequency range, detect when critical frequencies are being jammed or otherwise interfered with, and locate the source of the interference so that the interference can be eliminated. The WASN may use one or more of the above described geolocation techniques In addition, the WASN may detect and locate unauthorized transmitters as well as estimate the transmitted power of authorized transmitters to assure they are not transmitting more power than authorized.

In addition, a diversity receiver (the Time and Frequency Synchronization Unit) is disclosed. This diversity receiver generates position, time and frequency references for use in locating and synchronizing sensor platforms of a WLS. In an illustrative embodiment, the diversity receiver comprises a first receiver subsystem comprising a terrestrial broadcast receiver, and a common processor platform (CPP) coupled via first link means to the first receiver subsystem. The first receiver subsystem provides a stable time reference and position information to the CPP via the first link means. In addition, the diversity receiver includes second link means for coupling the diversity receiver to a sensor platform and providing time and frequency references and location data to the sensor platform.

In a more specific illustrative embodiment of the diversity receiver, the terrestrial broadcast receiver comprises an HDTV receiver. The terrestrial broadcast receiver may include an antenna for receiving an aiding signal communicating aiding information including broadcaster locations, channel assignments and timing characteristics and parameters. Alternatively, or in addition, the terrestrial broadcast receiver may include an aiding information interface for receiving aiding information including broadcaster locations, channel assignments and timing characteristics and parameters. In this example, the aiding information interface is configured to couple the terrestrial receiver to a landside aiding server or network.

In a further illustrative embodiment, the diversity receiver further comprises a second receiver subsystem comprising a GNSS receiver operatively coupled via third link means to the CPP. The second receiver subsystem provides a second stable time and frequency reference and position information to the CPP via the third link means. The GNSS receiver may include an aiding information interface for reception of a GNSS aiding signal communicating satellite constellation orbital information and other information used to correct for clock drift, atmosphere signal delay, and ionosphere delay, which are used to enhance the accuracy of a GNSS receiver's location estimate and the time and frequency references. In addition, the GNSS receiver may include an aiding information interface for receiving aiding information from a landside aiding server or network. Moreover, the GNSS receiver may be configured to operate in a static timing mode in which a time and frequency reference are provided when limited (at least one) GNSS signals are available. Given that the location, elevation, and velocity of the GNSS receiver is known, the GNSS static timing mode is enabled when at least one GNSS satellite signals (or when a timing broadcast, such as the Wide Area Augmentation System (WAAS), from either a terrestrial or satellite source) can be received. In Static timing mode, the GNSS receiver will provide a 1 pulse-per-second (PPS) timing signal with sufficient accuracy to enable the LMU to timestamp incoming signals to be located. If more than one GNSS satellite signals or WAAS broadcasts can be received then timing accuracy improves. Typically timing accuracy is 100 nanoseconds (ns) root-mean-squared (RMS) with a single GNSS satellite in view using the static timing mode. With additional satellites received, the timing accuracy can improve to 20 ns RMS. The CPP may be configured to designate a primary and secondary receiver subsystem based on time-to-fix, signal quality, or operator preference In yet a further illustrative embodiment, the diversity receiver includes a reference oscillator operatively coupled to the CPP, and the CPP is configured to communicate with the first and second receiver subsystems, to receive stable time signals from the receiver subsystems, and to use at least one of the time signals to discipline the reference oscillator. In addition, the CPP is further configured either to select one of the first and second receiver subsystems or to hybridize the information provided by the receiver subsystems to create an optimized time reference, frequency reference and timestamp to be provided to the sensor platform.

In addition to the foregoing, other aspects are described in the claims, drawings, and text forming a part of the present disclosure. It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Certain specific details are set forth in the following description and figures to provide a thorough understanding of various embodiments of the invention. Certain well-known details often associated with signal processing, computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

We will now describe illustrative embodiments of the present invention. First we provide a detailed overview of the problem and then a more detailed description of our solutions.

Wireless systems abound in many areas of the world. Every aspect of our modern life is significantly influenced by wireless technology. Whether it is the "anytime, anywhere" convenience of mobile phones or the entertainment provided by satellite television, wireless technology greatly impacts a modern society's productivity and well being. Recently, much of modern society's critical infrastructure has become dependent upon satellite navigation systems. Satellite navigation systems are used to determine the whereabouts of critical assets, assist in aircraft navigation including takeoffs and landings from airports and provide timing information for our telecommunications infrastructure. The great dependence of a modern society's upon wireless systems creates vulnerabilities to disruption of the wireless systems.

Wireless equipment is relatively unprotected to disruption by jamming and interference whether inadvertent or intentional. A system that is capable of being deployed over a wide area that detects, classifies and locates wireless signals would be useful for monitoring the airwaves for interference to critical wireless signals. Additionally, such a system could be used as a tool for many other purposes including optimization of the quality of wireless service. The system could use any of a number of well-known network-based location geolocation techniques to estimate the position of the emitter of interest.

Furthermore, such a system can determine the effective utilization of RF channels by measuring RF power versus frequency and time. With the upcoming switch to a digital TV format for over-the-air (OTA) TV, such a capability may also permit the determination of where unlicensed "white space" transmitters can be located as well as how much power they can transmit without interfering with digital OTA TV service.

Figure 1:
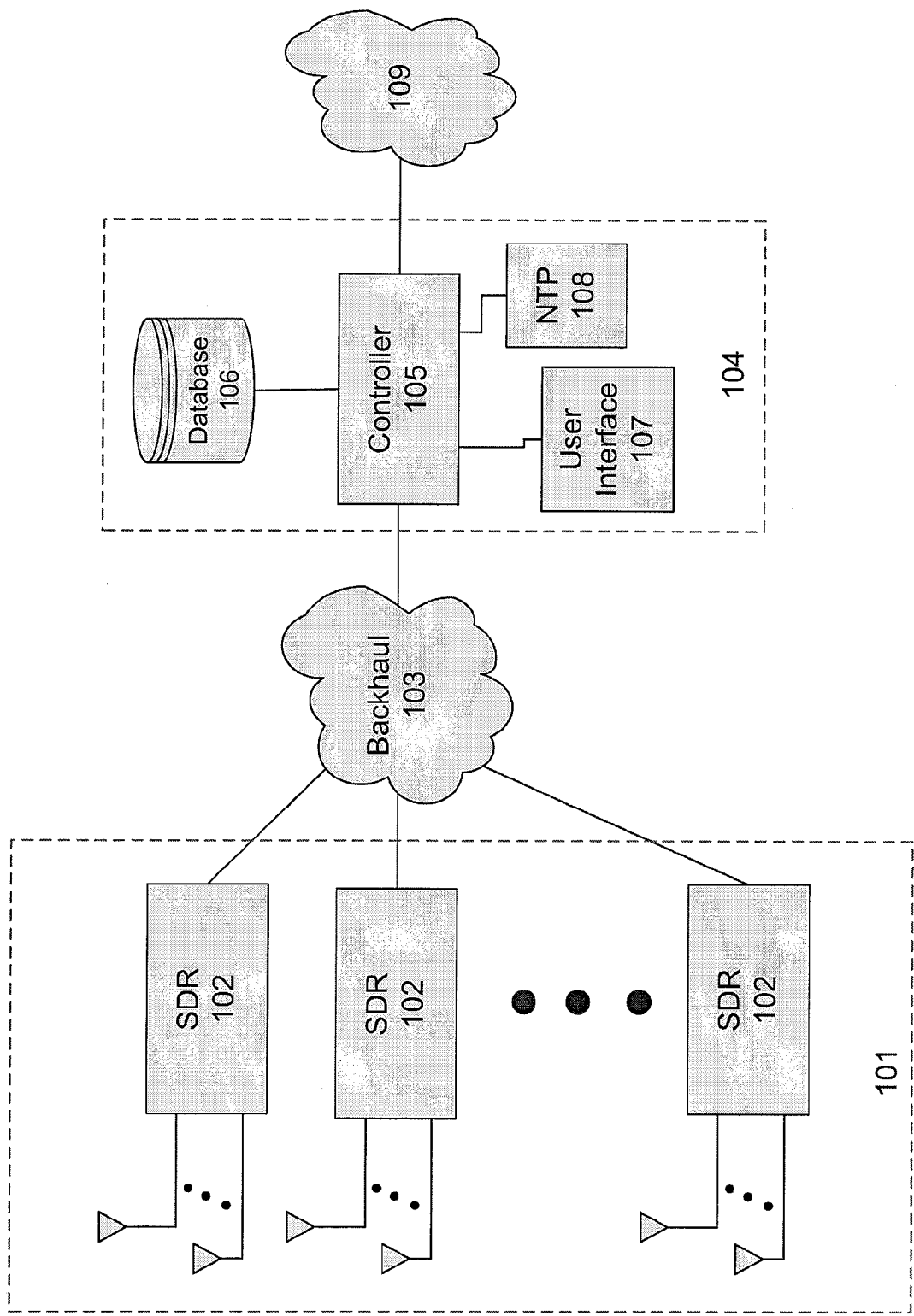
FIG. 1 schematically depicts the major functional nodes of the Wide Area Sensor Network.

A Wide Area Sensor Network may be a passive receiving system with the capability to detect and locate jamming and interference to critical wireless signals over a wide frequency band and large geographic area. An exemplary WASN is illustrated in FIG. 1. The WASN is comprised of a network of software defined radios (SDRs) 102 capable of a wide instantaneous bandwidth, a system controller/central processor 105 and a backhaul communications network 103 interconnecting the system controller/central processor 105 with the SDRs 102. Additionally, a database 106 may be a component of the system and connected to the controller/central processor 105 as well as one or more user interface terminals 107. The WASN may utilize the database 106 for storage of allowed transmitter characteristics and for archiving the results of various campaigns. The database 106 may also be used for map storage with multiple layers of geographic, topographic, radio modeling, and place name information.

The system controller/central processor 105 may also have an interface to an external communications network 109, for example the internet, and a connection to a NTP time server 108 providing coarse time information. In general, the SDRs 102 may be time and frequency synchronized to permit utilization of various geolocation techniques to locate wireless signals.

A WASN may be comprised of a variable number of SDRs. A time and location multiplexed WASN may be comprised of a single SDR that is moved from location to location in a serial fashion over the geographic area to be monitored. This configuration represents a minimal cost one suitable for detection, classification and location determination of physically stationary transmitters that transmit for long periods of time. A WASN may also be comprised of a large number of stationary SDRs distributed throughout the geographic area to be monitored similar to a network of base stations of a wireless cellular system. This configuration is better suited for the detection, classification and location of transient signals that only transmit for brief periods of time.

Figure 2:
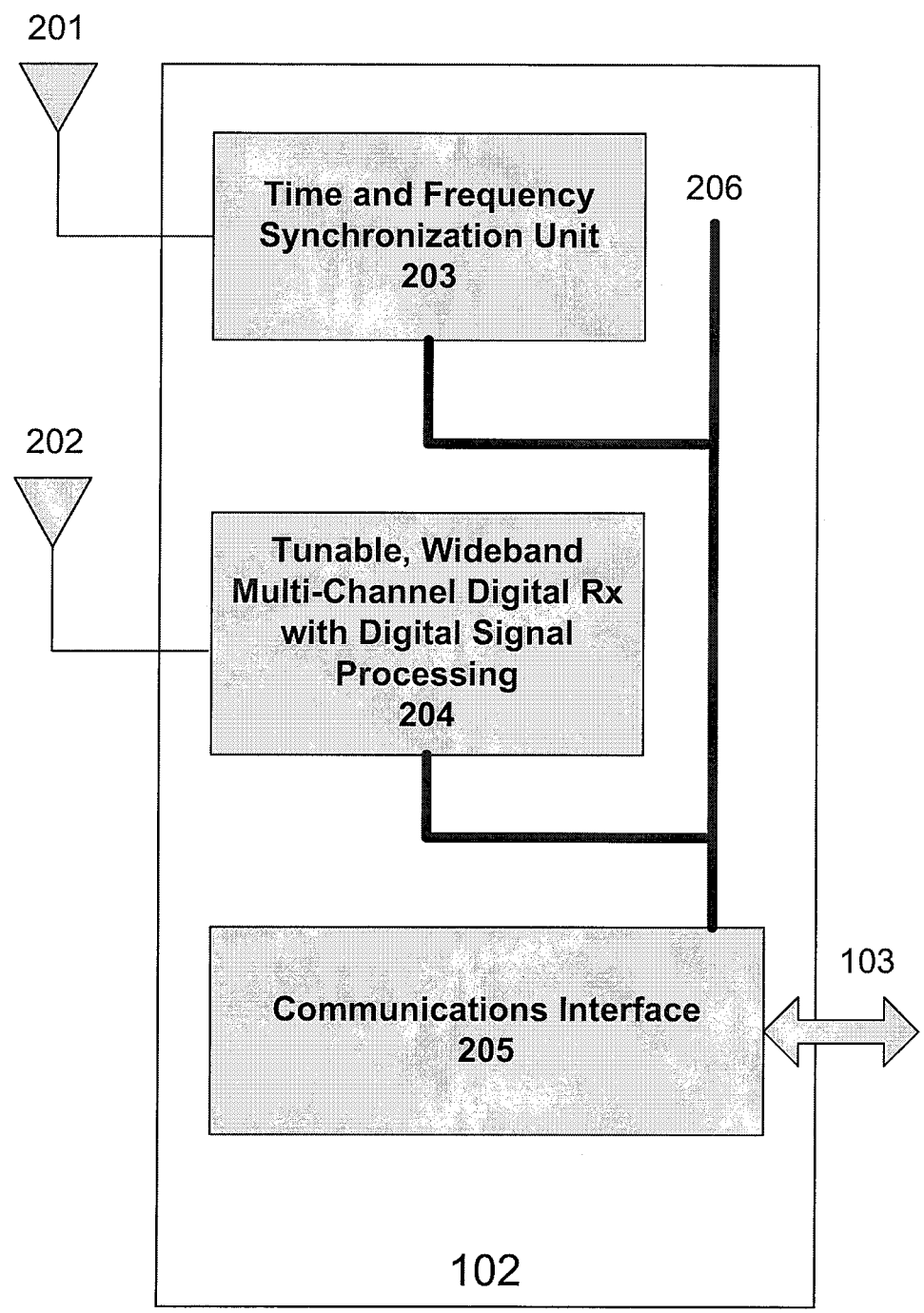
FIG. 2 schematically depicts the major functional nodes of the distributed sensor network receiver.
Figure 3:
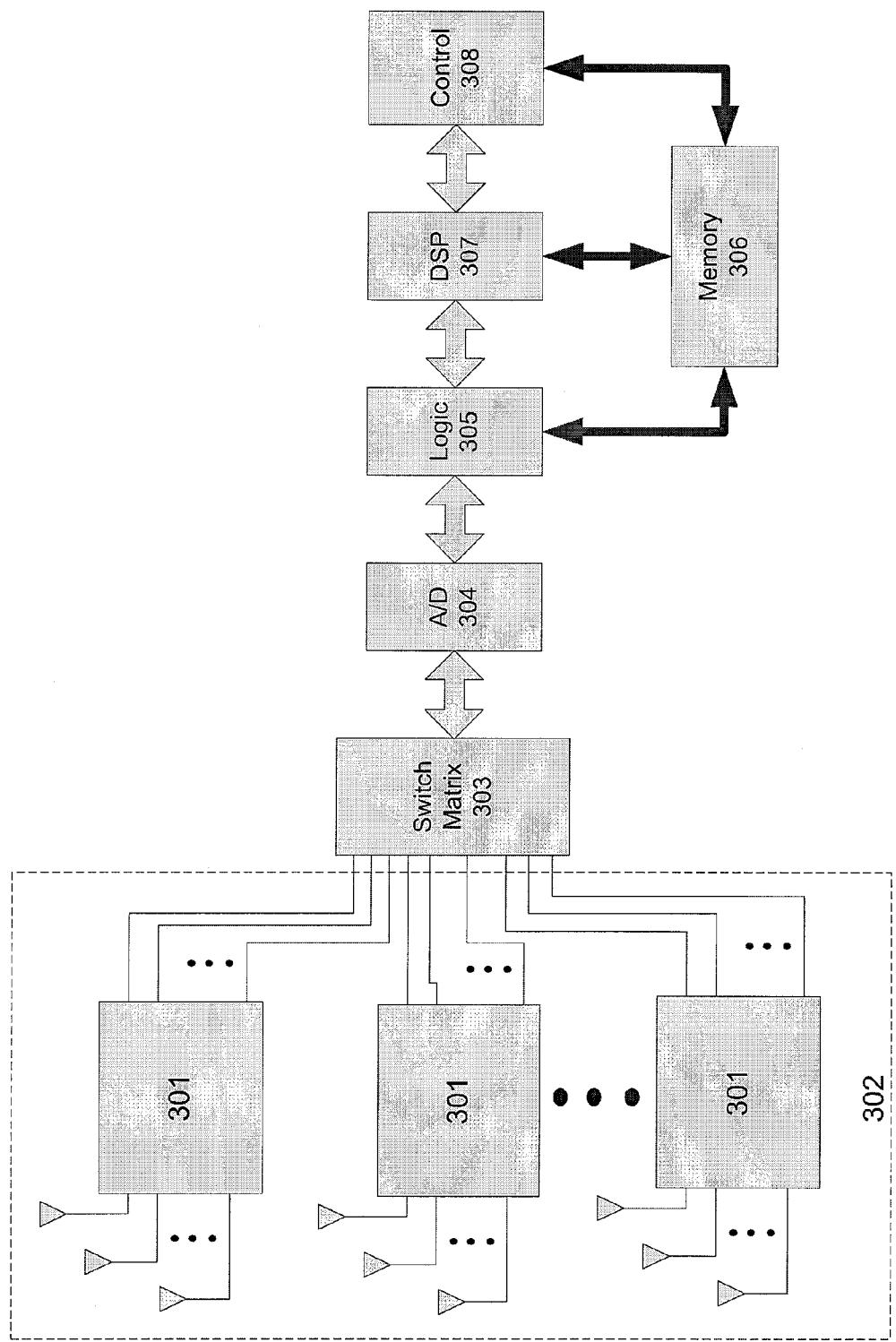
FIG. 3 schematically depicts major functional nodes of the Software Defined Radio (SDR) used by the distributed sensor network receiver.

A fundamental component of a WASN is the SDRs that comprise it. A block diagram of an exemplary SDR is shown in FIGS. 2 and 3. A key virtue of a SDR is the ability to change its configuration by reprogramming its programmable logic over an interface. An SDR may be comprised of one or more multichannel RF to Intermediate Frequency (IF) stages, a switch matrix, a set of analog-to-digital (A/D) converters, programmable logic, programmable digital signal processors, a control processor, memory, synchronization unit and a communication interface. The multichannel RF to IF stage serves to take a band of RF signals received by the antennas they are connected to and filter the signals to limit their bandwidth, amplify the signals, and translate the signals to an IF. The SDR may include a common local oscillator for all channels of a single multichannel RF to IF stage providing frequency coherence. Multiple multichannel RF to IF stages may use different local oscillators but a common time and frequency reference may be provided by the time and frequency synchronization unit. The switch matrix serves to select specific channels from the multitude of multichannel RF to IF stages and present the channels to the A/Ds. The A/Ds convert multiple channels of analog signals to a digital format at a specified sampling rate.

Once converted to a digital format, the signals can be operated upon by the programmable logic stage. A key feature of programmable logic is the ability to reprogram the logic over an interface to change its capability. Typical operations of the programmable logic are I and Q detection, further bandpass filtering and decimation of the sample rate, specific signal detection, and memory storage. The programmable digital signal processing (DSP) stage may be comprised of a number of programmable digital signal processors that can further process the signals from the programmable logic stage. Examples of the signal processing that are performed by the digital signal processors are detection, demodulation, equalization and location processing. The control processor may control and coordinate all of the resources of the SDR. The communications interface provides an interface external to the SDR to permit control of the SDR by the system controller/central processor and the transfer of data.

Figure 4:
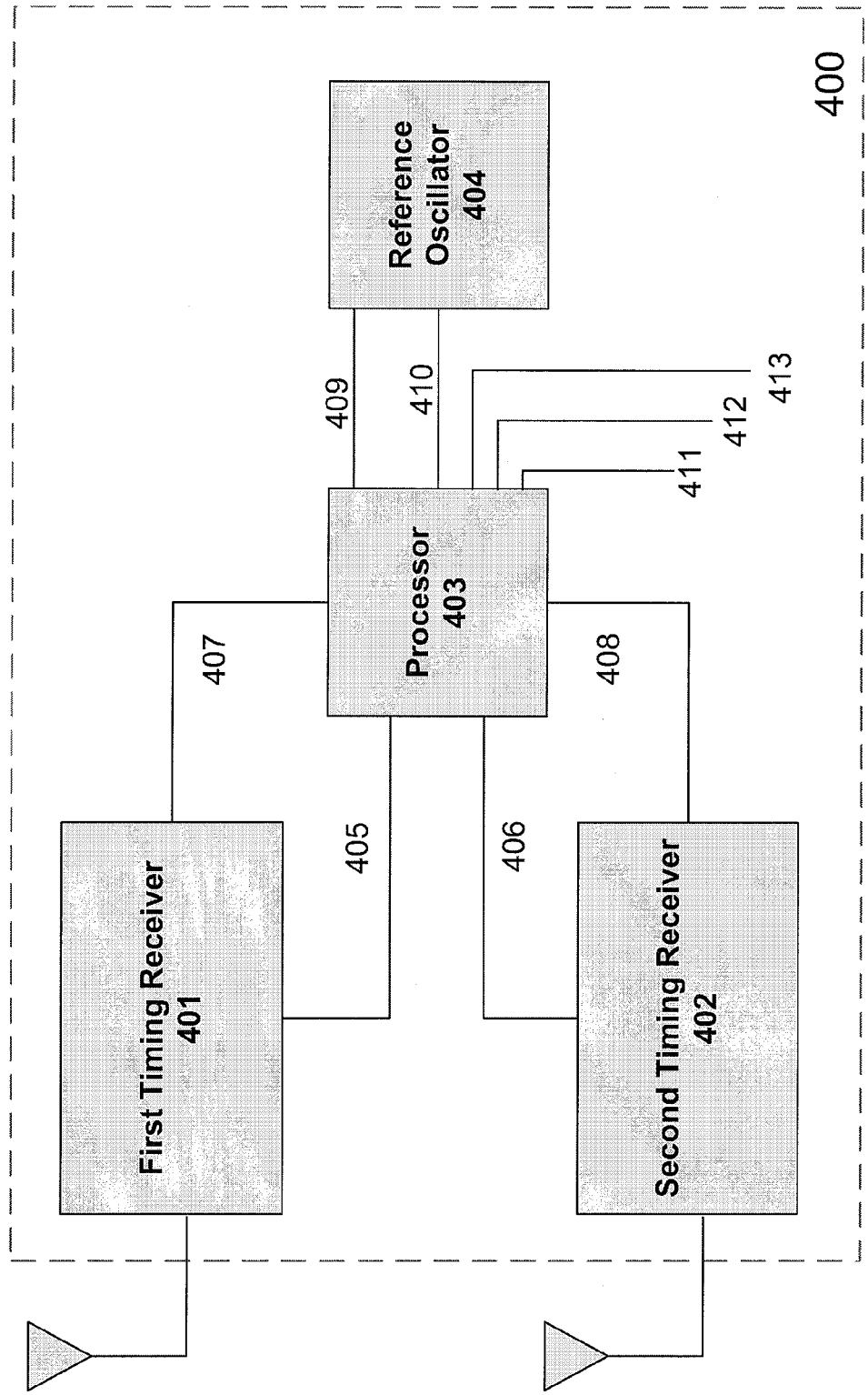
FIG. 4 schematically depicts major functional nodes of the timing reference subsystem of the distributed sensor network receiver.

The WASN may provide time and frequency synchronization between SDRs. Synchronization of the SDRs permits very precise time tagging of signals and events as well as the ability to implement various geolocation capabilities. A typical technique for time and frequency synchronizing two or more geometrically separated sites is via a GPS timing receiver. GPS timing receivers can provide very good time and frequency synchronization performance when each GPS timing receiver in the WASN can receive signals from four or more GPS satellites. GPS signals are designed to illuminate the earth at a power level of approximately −130 dBm. This power level is very low and can be further attenuated by the surroundings and environment. Consequently, there are many environments where a sufficient number of GPS satellite signals cannot be received and, therefore, one or more SDRs in the WASN may not be time and frequency synchronized with the other SDRs. This situation may be avoided through the use of multiple signals and techniques to provide time and frequency synchronization. FIG. 4 illustrates the time and frequency synchronization unit of the SDR utilizing a diversity of techniques. Each timing receiver provides a very accurate time clock from its respective signals. In this example the signal is a periodic waveform that provides a sharp rising edge every second. The processor of the time and frequency synchronization unit receives these 1 PPS signals, combines them intelligently, or simply selects one if only one is available, and then disciplines a reference oscillator to the signals.

The system controller/central processor may control the resources of the WASN, monitor the health and status of each resource, and determine the location of signals using information provided by the SDRs. The system controller/central processor may command the SDRs to tune to frequencies and bands and at what time and how long to collect data at the frequencies and bands. Additionally, the system controller/central processor may command the SDR to perform specific functions such as signal detection, signal characterization, and signal classification. The system controller/central processor may also determine the data that will be stored in the central database.

Interference Detection

The synchronous Wide Area Sensor Network may provide the capability to monitor critical frequency channels for interference over a wide area, detect when interference occurs, characterize the interference and locate its source. The GPS frequency channels are an example of a critical frequency. Signals from the GPS satellites are used for a multitude of critical applications from synchronizing telecommunications networks to providing navigation for the national air traffic system including the automated landing and take-off of commercial aircraft. Thus GPS signals are important to monitor and assure they are not impaired by inadvertent or intentional interference. The WASN may provide the ability to detect and locate such interference that is continuous in time or transient in nature.

Interference detection and location may begin with a priori knowledge of the signal or signals of interest. The a priori knowledge may include the frequency channels that the signals occupy and other characteristics such as its spectral characteristics (e.g., spectral density function). An exemplary process for monitoring critical frequency channels for interference, detecting interference and locating interference with the WASN is as follows:

Capture and store time domain data for a predetermined duration over the bandwidth of interest simultaneously for a group of SDRs Pass the captured data through digital downconverters implemented in the programmable logic of the SDRs to I/Q detect, bandlimit, increase the bit resolution and decimate, i.e. reduce, the sample rate of the time domain data.

Break the resulting data into equal time blocks

Convert each time block into the complex frequency domain

Determine the power statistics of each frequency bin

Apply a spectral mask of the legitimate signal

Identify interference by identifying the frequency bins with power that deviates significantly from the frequency mask Locate the interference utilizing TDOA if the signal possesses sufficient bandwidth, utilize AoA if the signal does not possess sufficient bandwidth and AoA antenna arrays are available at the required SDRs, or utilize PDOA Store the results in a database for future retrieval The above process may be implemented across the WASN in a continuous fashion or on command to monitor critical frequencies for interference and if interference exists, to locate and characterize the interference.

Signal Detection

The WASN may be used to detect, characterize and locate signals over the wide area it is deployed. This capability permits the survey and catalog of all signals over the frequency range of the SDRs. The WASN may survey and catalog legitimate signals to assure their characteristics are within required specifications. A database of legitimate signals can be compared to the results of the WASN to identify potential illegitimate signals such as unauthorized FM radio stations and video signals. The signal detection capability of the WASN may provide a map of where unlicensed "white space" transmitters may be located as well as the transmit power that a user can emit that would not interfere with legitimate digital TV signals.

An exemplary signal detection process is as follows:

Capture and store time domain data for a predetermined duration over the bandwidth of interest simultaneously for a group of SDRs Pass the captured data through digital downconverters implemented in the programmable logic of the SDRs to I/Q detect, bandlimit, increase the bit resolution and decimate, i.e. reduce, the sample rate of the time domain data.

Break the resulting data into equal time blocks

Convert each time block into the complex frequency domain

Determine the power statistics of each frequency bin

Identify the frequency bins with a power at the noise floor

Characterize the signals in frequency bins above the noise floor

Locate the detected signals utilizing TDOA if the signal possesses sufficient bandwidth, utilize AoA if the signal does not possess sufficient bandwidth and AoA antenna arrays are available at the required SDRs, or utilize PDOA Store the results in a database for future retrieval Signal Classification:

The WASN may permit a greater level of classification of signals than previously available because the WASN is comprised of a network of time and frequency synchronized sensors dispersed about a wide geographic area. This may provide the ability to determine the location of the origin of signals. Additionally, once the location is determined, readily available propagation models of the environment may be utilized to provide the ability to estimate the absolute power transmitted by the signal. Thus, the WASN may provide the ability classify most or all signals over the geographic area where it is deployed. Signal characteristics may include:

Center frequency
Bandwidth
Modulation type
Symbol rate (if digitally modulated)
Two Dimensional Location (latitude and longitude)
Absolute power FIG. 1 schematically depicts the major functional nodes of the WASN. The geographically distributed receiver network 101 is shown. Each of the three or more receivers 102 with representative antennae connects via wired or wireless data backhaul network 103 to the controller 105. The controller 105 is a generic computer processing server with custom software to perform tasking, scheduling, signal detection, signal characterization and location estimation. The controller 105 is served by a database system 106 allowing calibration data, historical location data, geographical data, and propagation models to be used in the location estimation processing. The controller 105 also connects via digital data link (such as an internal data bus, a local area network or a wide area data network) to a user interface 107 which serves as the human-machine-interface with the Wide Area Sensor Network. The various operation, administration, provisioning, and maintenance operations may be accomplished via the user interface 107. The user interface 107 in this example is implemented as a software application running on a client processor platform.

The NTP 108 (Network Time Protocol) node supplies a stable time reference to the controller 105 via a TCP/IP based digital data link. The operational details of NTP can be found in RFC 778, RFC 891, RFC 956, RFC 958, and RFC 1305. Network 109 represents an external network, such as the internet, providing auxiliary information to the WASN such as GPS assistance data or lists of legitimate emitters.

FIG. 2 illustrates a more detailed depiction of the Software Defined Radio (SDR) receiver 102 shown in FIG. 1. As shown, a first antenna structure 201 allows over the air determination of the common system time reference required to synchronize the SDR network 101. The system time and frequency reference in this example is distributed over internal analog and digital buses 206 from the Timing Receiver 203 to the Tunable Wideband Digital Receiver 204 and the Communications Interface 205.

A second set of antenna 202 serves the Tunable Wideband Digital Receiver 204. The second Antenna structure 202 may include specialized directional antenna for Angle-of-Arrival signal location determination.

The Tunable Wideband Digital Receiver 204 is preferably implemented as a software defined radio (SDR). The communications interface 205 serves to route and bridge location related and timing information to the controller 105 over the backhaul network 103.

FIG. 3 schematically depicts the functional stages of a multiband, tunable, multichannel wideband software defined radio (SDR). The antenna structure 302 allows for multiple receive antenna to be used for a single SDR as well as multiple time and frequency synchronization sources. The antennas are connected to an RF stage 301 where amplification, filtering and translation to an intermediate frequency (IF) of the bandwidth of interest is performed. Multiple RF to IF stages 301 are used to support reception of bands of interest, thus overcoming limitations inherent in amplifiers and filters occurring when very wide bandwidths are required.

The various RF to IF stages 301 feed a analog switch matrix 303 allowing the SDR to select the band to be observed. The multichannel output is passed to the analog to digital converter (A/D) 304 where multiple channels of the band limited signal is converted to a digital representation. The SDR's Logic 305 and Digital Signal Processor(s) 307 stages handle the filtering, down-conversion, demodulation and digital baseband signal analysis. The control section 308 is sets the dynamic control of the sample rates, bandwidth of interest selection storage of received signals and interconnection to entities served by the SDR and various administrative tasks. The SDR memory 306 consist of RAM, ROM and high speed RAM needed for both the control of the SDR and storage of received signals.

FIG. 4 provides a more detailed view of the diversity timing receiver 400 and associated antenna structures that serves the SDR as a time and frequency reference. In the timing receiver 400, a first 401 and second 402 timing receiver is used. The dual timing receivers 401 402 allow for determination of a clock and frequency reference in cases where one receiver is blocked. The dual timing receiver 401 402 arrangement also allows for increased holdover in cases where one receiver is temporarily blocked.

The first timing receiver 401 is connected to a central processor via digital data link 405 and an analog timing link 407 allowing for operational messaging and timing related messages to pass between the receiver and the processor as well as allowing analog timing signals to pass from the first timing receiver 401 to the processor.

The second timing receiver 402 is connected to a central processor via digital data link 406 and an analog timing link 408 allowing for operational messaging and timing related messages to pass between the receiver and the processor as well as analog timing signals to pass from the first second receiver 403 to the processor.

The processor 403 is connected to a reference oscillator 404 via data feedback control link 409 and an analog timing link 410 allowing for fine control of the oscillator's frequency as well as allowing analog timing signals to pass from the reference oscillator 404 to the processor.

The processor 403 may discipline the reference oscillator 404 to either timing receiver to provide a time and frequency reference to the SDR depending upon which timing receiver has the better reception on their signals.

The SDR is provided the time and frequency reference via an analog timing signal 411, timing messaging via a digital link 412 and an analog frequency reference 413.

User Interface:

The WASN may provide the capability to measure and characterize wireless signals over a wide area in multiple dimensions. A few of these dimensions are:

Time
Frequency
Power
Location

Figure 5:
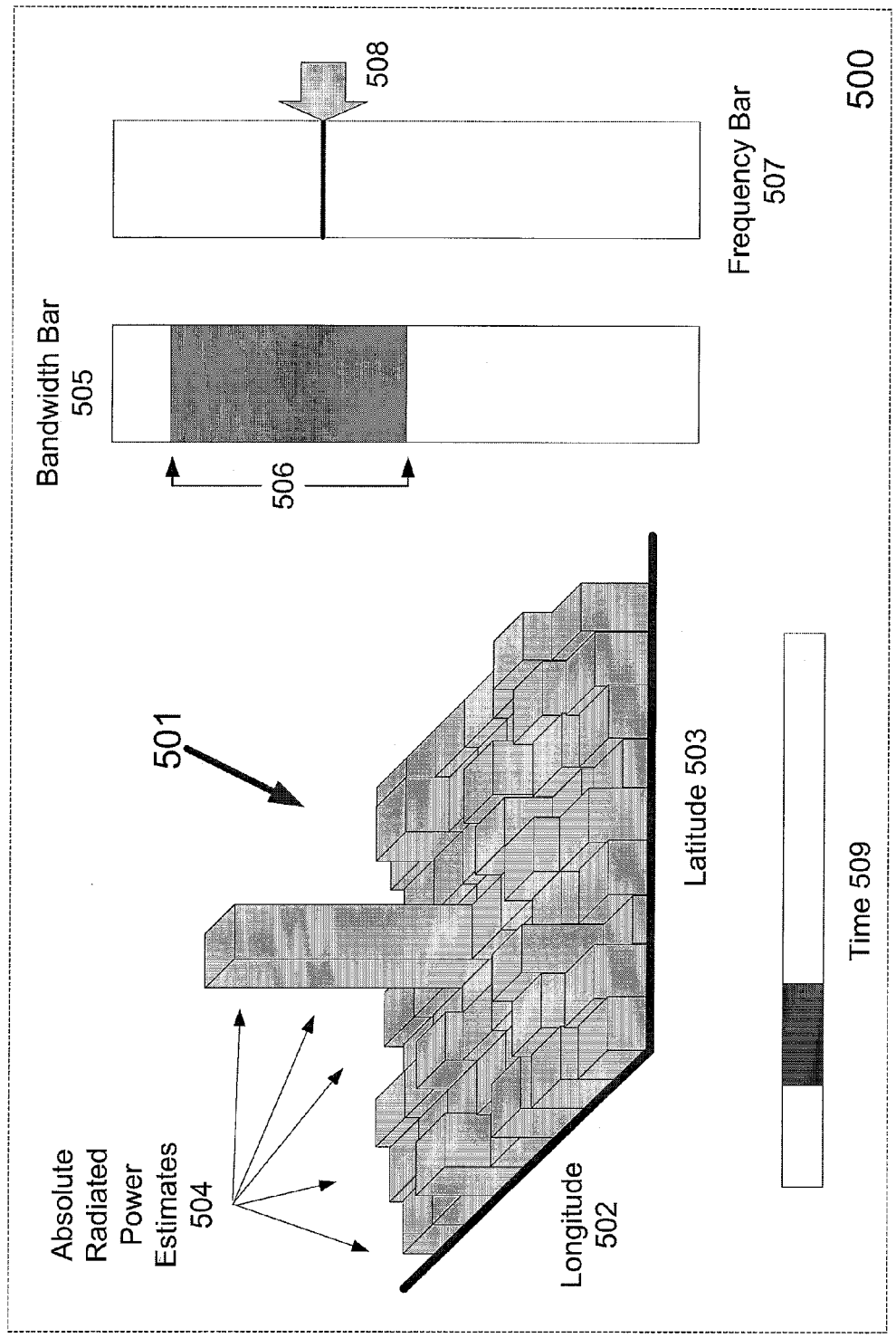
FIG. 5 depicts an example user interface for the Wide Area Sensor Network.

The user interface for the WASN may provide user control of its resources as well as a display of its results. The above four dimensions of data may be displayed in two forms. The first is illustrated in FIG. 5 as a contour plot of power over a range of latitude and longitude, in location, for a specific time as indicated by the time slider and a specific frequency and bandwidth as indicated by the frequency and bandwidth sliders. The other form is a 3-D plot of time and frequency versus power with the 2D location defined by positioning a cursor over a range of latitude and longitude as shown in FIG. 6.

FIG. 5 depicts an example of the user interface with the WASN. Illustrated is a example screenshot 501 of the user interface displaying an exemplary campaign. A 3-D map 501 displays the location of an emitter via the latitude 503 axis and the longitude 502 axis as determined by the location processor and the computed absolute radiated power 503 over the examined bandwidth. The examined bandwidth 506 is shown on a bar display 505. The center frequency 508 of the examined bandwidth is depicted on a frequency bar display 507. The time of the spectral examination can be selected on the time bar 509.

The user interface 500 in this example provides both input and output and uses the database facility of the WASN to store signal and location data over time. Each bar display allows the user to determine the signal power and location for an adjustable bandwidth, center frequency and time span using a mouse-driven point-and-click interface.

Figure 6:
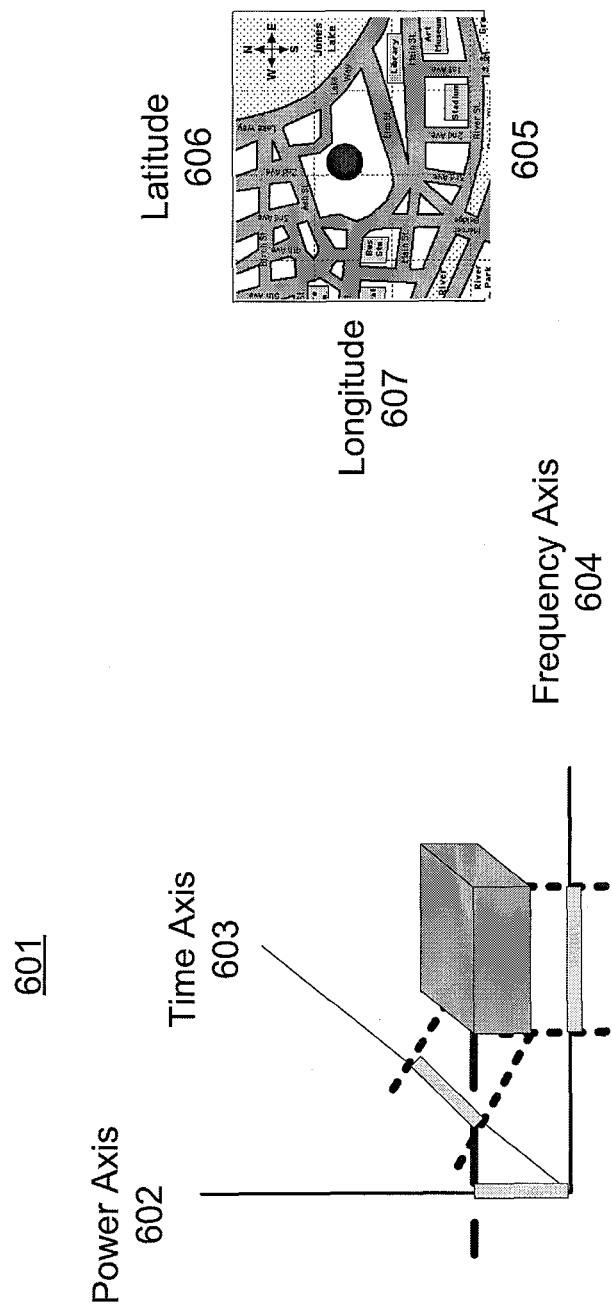
FIG. 6 depicts another example user interface for the Wide Area Sensor Network.

FIG. 6 illustrates another graphical user interface example in which a 3-dimensional map 601 of power 602, time 603, and frequency 604 is used with a geographic map shown here as a 2-dimensional street map. The location determination may include an altitude or elevation. Using the persistent database to store signal and location information, the user interface can be used to both show real-time campaign data as well as past location and signal data.

Applications:

Applications may reside on the system controller/central processor and harness the capability of the WASN to perform a number of operations. WASN applications may include:

Interference Detection and Localization

The Interference Detection and Location application utilizes the capability of the WASN to monitor user defined critical bands, channels and frequencies to detect the presence of unauthorized signals which will be defined as "interference." Apriority characteristics of authorized signals are utilized to assist in detecting interference. Once detected, the location of the interference is determined. The results of Interference Detection and Location campaigns are stored to the database and/or displayed on the user interface.

Signal Survey

The Signal Survey application utilizes the signal detection capability of the WASN to determine the characteristics and location of all signals over the deployed area of the WASN. Results of a Signal Survey campaign are stored to the database and/or displayed on the user interface.

Unauthorized Transmitter Detection and Localization

The Unauthorized Transmitter application compares the output of a signal survey campaign to a list of authorized signals to identify potential illegal transmitters.

Spoofer Detection

Spoofing signals are signals that attempt to masquerade as a valid signal in order to confuse or spoof one or more users. For example, a spoofing Global-Navigation-Satellite-System (GNSS) signal would attempt to fool the GNSS receiver so that the receiver determines it is in a location that it is not. The WASN detects and locates spoofing signals by acquiring and characterizing the spoofing signals. The characteristics of the spoofing signals are compared to the characteristics of the legitimate signal(s) and the WASN notes when there is a significant deviation. Using the example of a spoofed GNSS signal, the absolute power level of this signal can be determined and if it is much greater than a legitimate GNSS signal, then the signal is identified as a spoofing signal. Another method of identifying a spoofing GNSS signal is to determine that a received signal is identified with a satellite that is not currently available (e.g., over-the-horizon). The current example of a GNSS system is the United States NavStar Global Positioning System (GPS).

Spectral Utilization

The Spectral Utilization application monitors the transmissions from detected signals over a significant length of time to determine the percentage of time that RF energy is being transmitted, which provides a percentage occupancy metric. Additionally, the percentage of time that RF energy is being transmitted quantifies the geographic coverage that this particular transmitter provides. Results of a Spectral Utilization campaign are stored to a database for archive and/or displayed on the user interface.

Unlicensed "White Space" Transmitter Power and Placement

The Unlicensed "White Space" application utilizes the WASN signal detection capability to identify and locate digital TV transmitters as well as estimate the transmitters' transmitted power. With this information the WASN determines the power level that a "white space" transmitter can transmit without interfering with the authorized and licensed digital TV transmitters over the geographic area of the WASN.

Illustrative Example

GNSS Jammer Detection and Location

In this illustrative example, a deployed Wireless Location System with a Location Measurement Unit (LMU) network with a geographically distributed network of wideband software receivers is used. Furthermore, the Global Navigation Satellite System(s) (GNSS) is described as the United States NavStar Global Positioning System (GPS). Other GNSS systems (Galileo, GLONASS, Compass, etc.) or combinations of satellites from multiple GNSS systems may be used together with or in place of the GPS system.

The current LMU network is equipped with distinct wideband receivers for uplink and downlink localization and a GPS receiver for receiving a common clock reference. The LMU network itself is relatively protected from low-power GPS jammers and ideally situated to detect and locate the jammers. The LMU GPS receiver is usually installed with minimal nearby obstructions and ideally at an elevation above nearby structures.

GPS wideband CDMA signals are weak and radiate from space vehicles in polar orbit. At a GPS receiver's antenna in the open air, GPS signals strength range from 130-160 dbm or about $1 \times 10^{-16}$ watts. Given the wavelengths used, reflections from the ground and surrounding structures are even further attenuated. It is the ratio of the signal power to the noise power per unit bandwidth that determines the ability to track and use each satellite. Therefore, GPS jammers (even unintentional ones) typically transmit broadband white/grey noise to increase the local noise floor and thus disrupt any local GPS receivers. To locate the jammers, the problem is first to detect the jammer(s), and second to locate the jammers.

Figure 7:
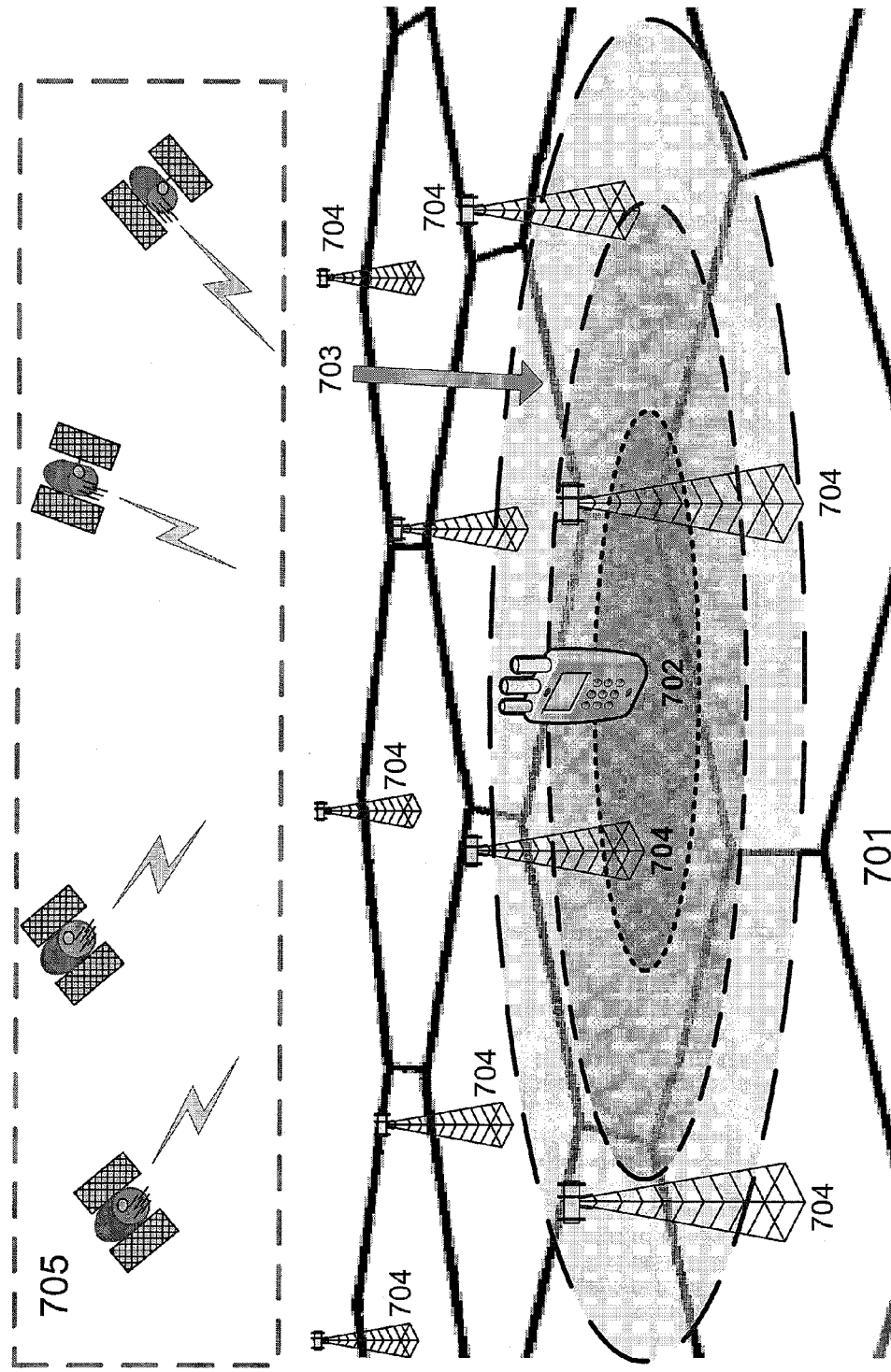
FIG. 7 illustrates an example use of the WASN in detecting and locating a Global Navigation Satellite System (GNSS) jammer.

As illustrated in FIG. 7, the wireless communications system 701 comprises cells distributed to provide coverage over the geographic service area. Radio equipment for the communications network is housed in cell sites 704 co-located with the SDR receivers, providing the SDR network with geographic distribution and shared facilities and antenna mounts. The GNSS system (the GPS system in this example) is shown in 705 with accompanying radio broadcasts.

The GPS jammer 702 transmits the jamming radio signal that propagates over an area 703 determined by the transmit power and ground clutter. The propagation pattern 703 may also be shaped by a directional transmission antenna.

Using known methods, the GPS receiver subsystem can detect the presence of jamming and alert outside parties. Such jamming may be limited to a single LMU or a group of LMUs. Known non-military GNSS jammers have ranges from 10's of meters to 10's of kilometers but are likely to be relatively low-powered portable devices.

In order to detect an intentional or unintentional source of GNSS jamming, the LMU can maintain a baseline Signal to Noise Ratio (SNR) over a complete cycle of visible GPS satellites. When a threshold SNR is crossed, a jammer location event can be initiated.

For small and/or low powered GNSS jammers, location of the GNSS jammer may be determined with techniques such as time of arrival (TOA) or power of arrival (POA) based ranging, or TDOA or AOA depending upon the transmit power, the RF environment, and duration of the signal. Modifications to the current LMU GPS receiver antenna or replacement of the GPS receiver by a wideband SDR may be used to enable the GPS jammer receiver. For large scale GNSS jamming events, the affected LMUs can be plotted and the center of gravity of the LMU coverage area can be determined as the jammer location. LMUs can be selected for TDOA and/or AOA location determination based on a preliminary TOA or POA based location. LMUs can further be selected based on the location technology deployed and the power and bandwidth of the jamming signal(s) in order to provide a more accurate location of the jammer.

If an LMU is located near a jammer and loses its GPS signal, the LMU can nevertheless be potentially used to collect the jammer's transmitted reference signal even if the LMU cannot be used as a cooperator. Using downlink beacon monitoring for timing or messaging from the network for coarse timing, a reference signal can be collected, compressed, and distributed to cooperating LMUs that have good timing references.

For general call location determination, the technique of using an LMU that does not have accurate timing for detecting and demodulating the reference signal can still be used. Such an LMU would not be used as a cooperator since its timing is not accurate enough for location processing. However, through downlink monitoring and/or network timing, the LMU can be used for detection and demodulation of the jammer's transmitted reference signal.

In the case when locating a GNSS jamming source, a TDOA or AOA location may be performed. Assuming that the GNSS jamming signal is a type of noise source that is changing and is always on, an LMU or similar device can collect a sample of the signal at a specific time interval. The data may be compressed and sent to cooperating LMUs to perform a correlation and determine a location.

In the case where the system is locating a jamming source that is a clean tone or series of tones and not changing over time, the change in SNR of the GPS signal from its baseline SNR at all of the cooperating LMUs can be used to calculate a location based on the power level affect of SNR at each affected LMU site, similar to the process of calculating a TDOA location. Instead of time difference of arrival, the power gradient (POA or PDOA) of the jamming signal may be used.

Illustrative Example

GNSS Spoofer Detection and Location

In another illustrative example, the geographically distributed LMU network with its co-located wideband and GPS receivers can be used to locate GNSS spoofers in accordance with the present disclosure.

GNSS spoofing generally involves a transmitter mimicking GNSS satellite transmissions, typically at a higher power then delivered by the space vehicle at receiver elevation. In some cases, identification information of space vehicles not in view (e.g., over-the-horizon) of the receiver can be used to mimic the space vehicle for spoofing.

When the spoofer is mimicking GNSS satellite transmissions, the distributed receiver network allows for detection of the spoofing transmitter by the increase in signal power of the spoofing signal.

In the case where identification information of space vehicles not in view of the receiver is used to mimic the space vehicle, the addition of a satellite not predicted to be available due to orbital mechanics can be detected.

In both cases, the wideband spoofing signal can be used to determine the location of the spoofing transmitter via PDOA, TOA, TDOA, AoA, or hybrid techniques.

Illustrative Example

IMSI Catcher Detection

As described in common assigned U.S. patent application Ser. No. 11/948,244 "Autonomous Configuration of a Wireless Location System," incorporated herein by reference, the wideband downlink receivers of the LMU network can be used to detect, identify, and locate GSM, CDMA, CDMA-2000, and UMTS wireless communications systems via base station beacon transmissions. In the Autonomous Configuration application, new base stations can be determined as well as changes to base station identification and frequency allotments.

A rogue Base Transceiver Station (BTS) (also called an IMSI-catcher) is described in European Patent EP1051053, "Method for identifying a mobile phone user or for eavesdropping on outgoing calls" and in U.S. patent application Ser. No. 11/996,230; "Acquiring Identity Parameters by Emulating Base Stations." As described, a rogue BTS simulates a wireless network and mimics a base station belonging to the local wireless communications network by transmitting a beacon belonging to an already existing base station. Using the detection, identification, and location capabilities of the LMU network of geographically distributed receivers and the Serving Mobile Location Center (SMLC) as the controller, the duplicative mimicked base station beacons can be detected, identified and located.

Figure 8:
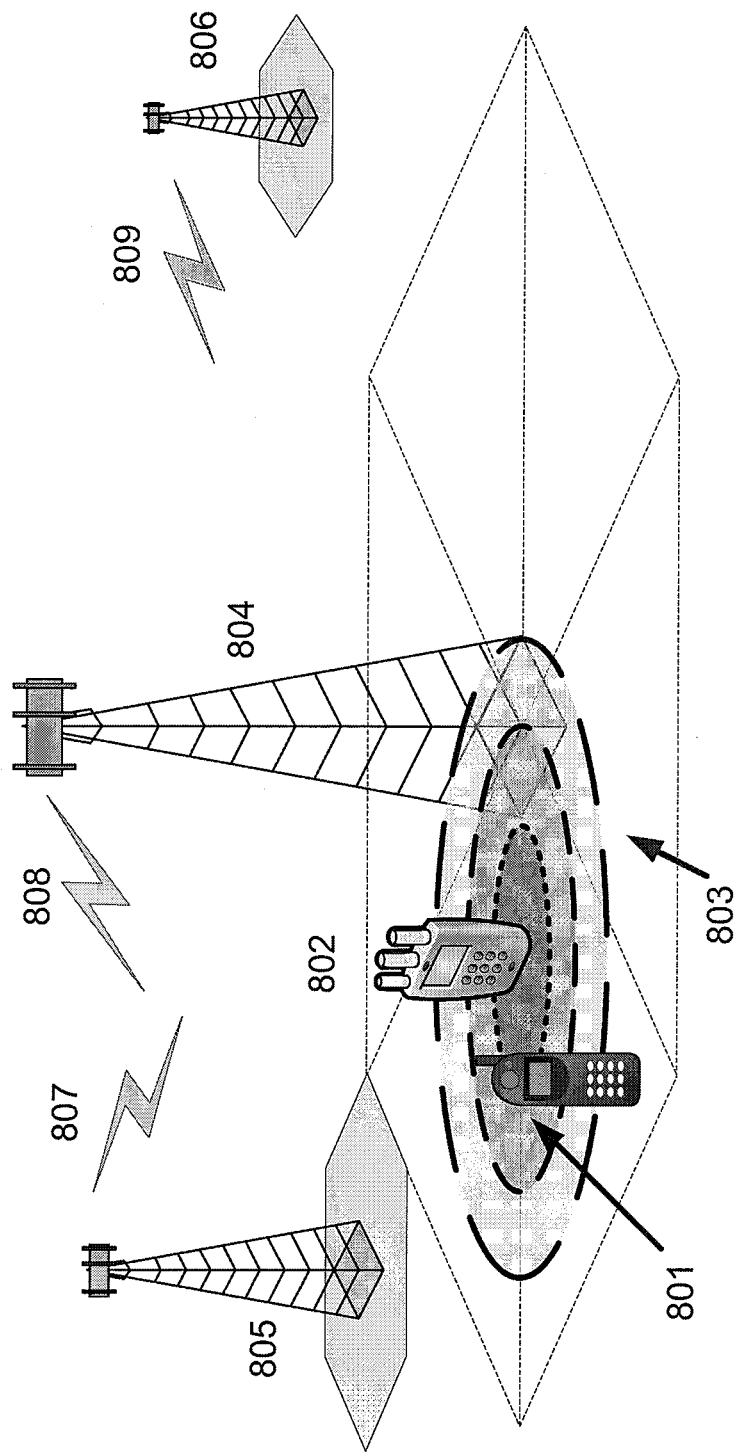
FIG. 8 illustrates an example use of the WASN in detecting and locating a rogue Base Station.

FIG. 8 illustrates an example of the distributed network-based IMSI-catcher rogue BTS locator in accordance with the present disclosure. A low powered IMSI-catcher 802 collects information on the local beacons 807 808 809 including power, identification, and neighbor lists. The IMSI-catcher 802 then broadcasts its own mimic beacon which propagates over a geographic area 803. The target mobile/user equipment 801 performs a location update to the IMSI-catcher's emulated network.

The SDR receivers in this example are co-located in the close 804, neighboring 805, and proximate 806 cells. Having in the past already detected, identified, located and stored the close 804 neighboring 805 and 806 proximate cells, the SDR receivers may detect the mimic beacon 803 and identify a rogue BTS. The SDR network is tuned to locate the rogue BTS and information regarding the rogue BTS is delivered to the user interface for analysis and action.

Figure 9A:
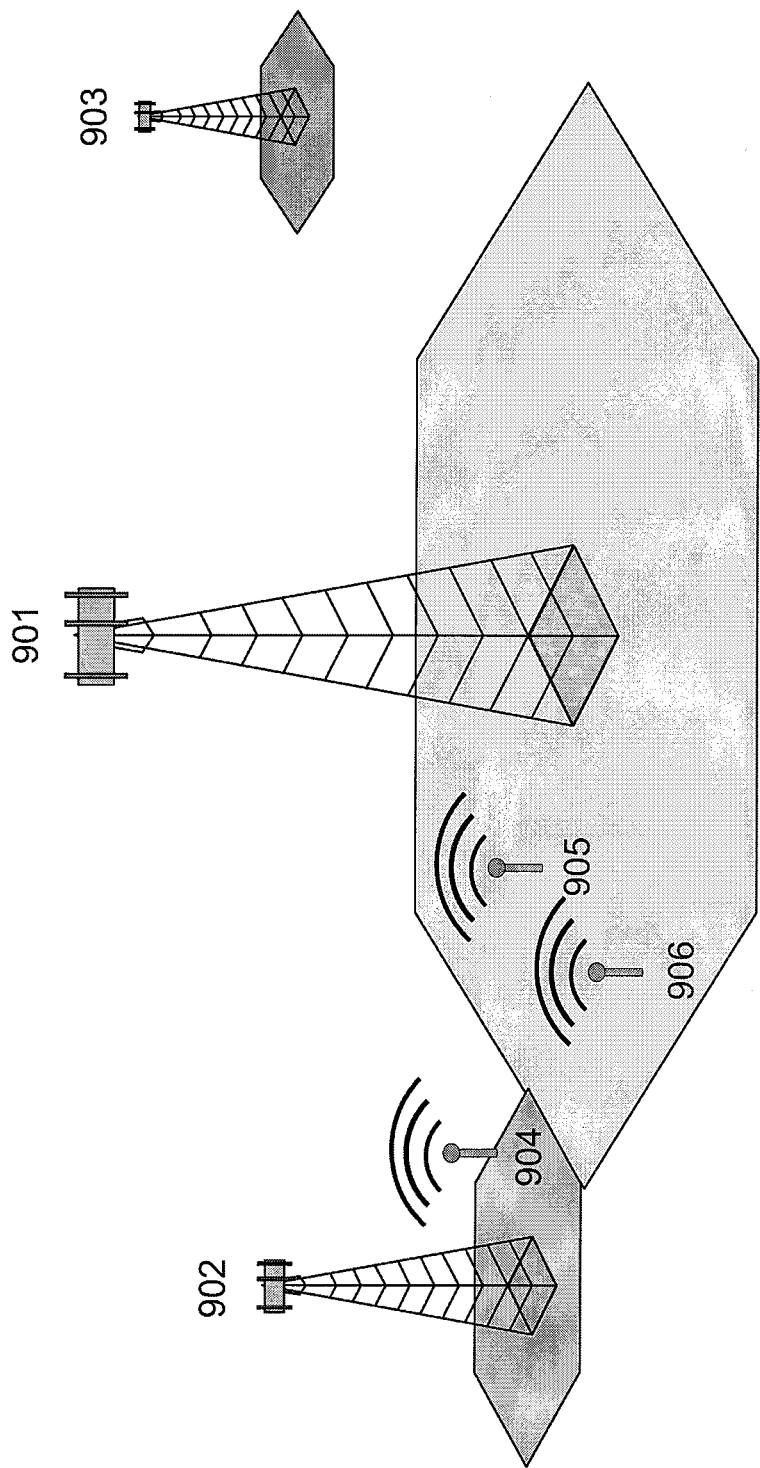
FIG. 9a illustrates an example use of the WASN in detecting and locating an intermittent inadvertent interferer.
Figure 9B:
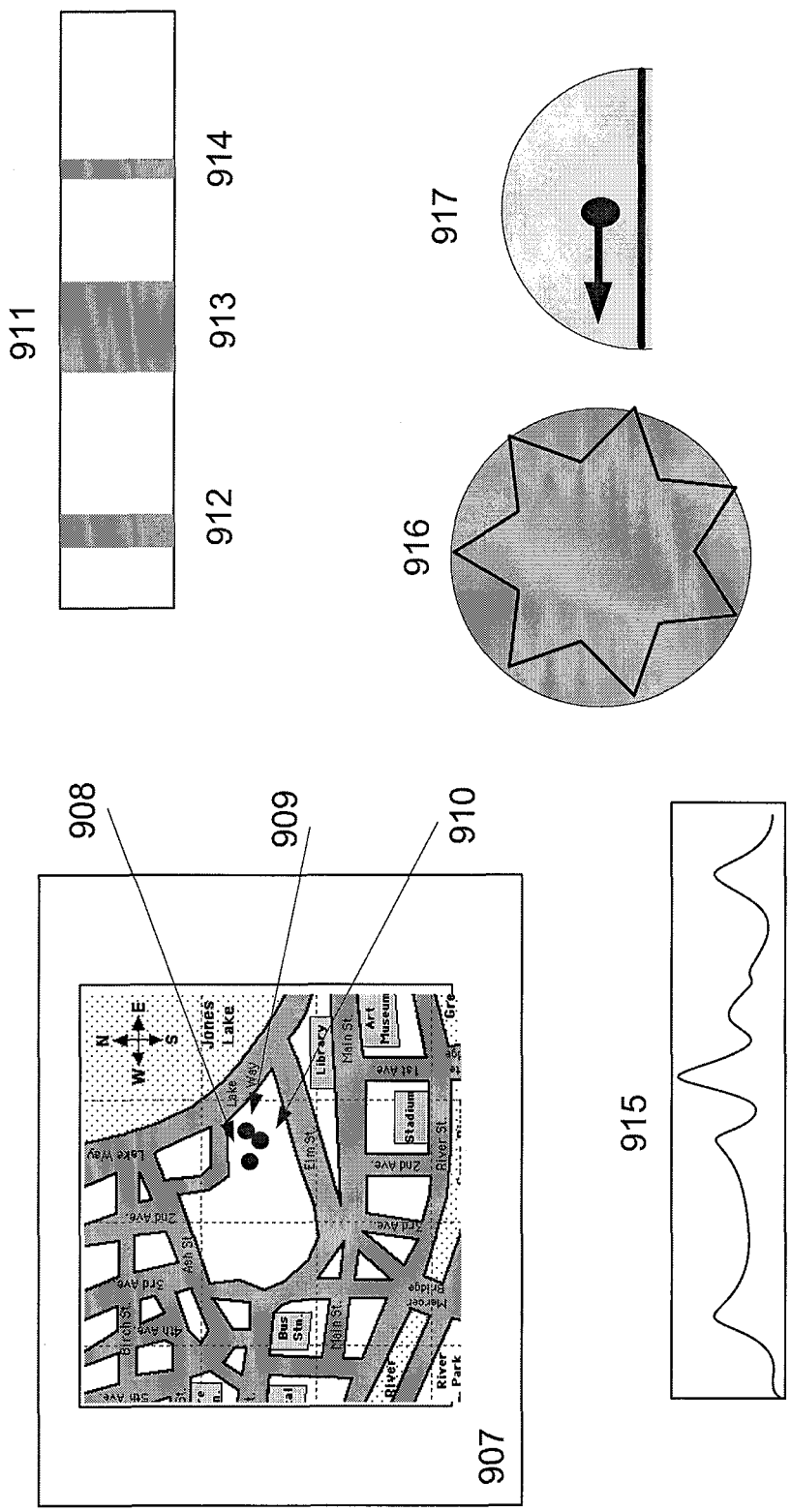
FIG. 9b illustrates an example visualization of the WASN user interface when detecting and locating an intermittent inadvertent interferer.

In FIG. 9a, an example use of the WASN is depicted. In this example, sensor receivers 901 902 903 are distributed over a geographic area served by a wireless communications or broadcast system. At disparate times, interfering signals 904 905 906 are detected and located. FIG. 9b depicts a resulting user interface display. On the map display 907, the sources of the interfering signals 904 905 906 are displayed geographically 908 909 910. The time and duration of the interference is displayed on the time bar display 911 with interfering events 904 905 906 shown graphically as 912 913 914. The spectral bar 915 displays the distribution of power over frequency for event 904. The compass rose 916 is grayed out, showing that no heading is available for event 904. The speed indicator 917 indicates a speed of zero which, together with the compass rose, indicates that event 904 was stationary over the time duration 912.

Diversity Time and Frequency Location Receiver

Geolocation with TOA or TDOA techniques with a network of sensors requires that the location of the sensors (also known as Positioning Determining Entities (PDEs), Signal Collection Systems (SCSs) or Location Measurement Units (LMUs)) be known and that the sensors be tightly synchronized with each other in time. Frequency-Difference-of-Arrival (FDOA) geolocation techniques with a network of sensors require the sensor locations to be known and that the sensors be tightly synchronized with each other in frequency. Utilizing GPS/GNSS timing receivers in the static sensors provides a convenient way to determine the locations of the sensors as well as to achieve a high level of time and frequency synchronization performance. However, GPS/GNSS timing receivers can only provide this level of location and synchronization performance when they have an unobstructed view of the sky. As described in U.S. Pat. No. 6,351,235, "Method and System for Synchronizing Receiver Systems of a Wireless Location System," Feb. 26, 2002 (assigned to TruePosition, Inc.), the GPS receiver is used to provide each LMU (and therefore the WLS in general) with a common, high precision timing reference for uplink TOA and TDOA (U-TDOA) location and to create assistance messaging for downlink technologies such as Enhanced Observed Time Difference (EOTD), Advanced Forward Link Trilateration (AFLT), Enhanced Forward Link Trilateration (EFLT), Observed Time Difference of Arrival (OTDOA) and Assisted GNSS (A-GNSS) (as described in U.S. patent application Ser. No. 11/321,893, "GPS Synchronization For Wireless Communications Stations," filed on Dec. 29, 2005 (assigned to TruePosition, Inc.).

As noted in U.S. patent application Ser. No. 11/948,244, "Automated Configuration of a Wireless Location System," filed on Nov. 30, 2007, the GPS timing signal also produces a very precise frequency reference signal. Other GNSS systems are expected to provide similar frequency precision when operative.

In addition to GNSS systems, terrestrial radio broadcast systems may also be used to provide both the timing reference, frequency reference, and the LMU location via TOA or TDOA techniques. The location so provided is that of the terrestrial radio broadcast receiver antenna, which then can be calibrated for signal delay through the receiver, antenna and associated cabling.

In many operational deployment scenarios, a clear view of the sky, or even a view of a significant fraction of the sky, is not feasible. Therefore, it is useful to include a hybrid or fallback technique into the sensor platform for determining their position as well as synchronizing to the other sensors in the wireless location network in time and frequency, in effect, providing diversity for synchronizing the sensors and determining their location.

Technology for determining a receiver's location, based upon terrestrial broadcast transmitters of known positions, has been recently developed. (See U.S. patent application Ser. No. 09/887,158, "Position Location using Broadcast Digital Television Signals," filed Jun. 21, 2001; U.S. Pat. No. 6,559,800, "Position Location Using Broadcast Analog Television Signals," May 6, 2003; U.S. Pat. No. 6,879,286, "Position Location Using Ghost Canceling Reference Television Signals," Apr. 12, 2005; and U.S. Pat. No. 5,510,801, "Location Determination System And Method Using Television Broadcast Signals," Apr. 23, 1996.) In addition, the terrestrial (downlink) broadcasts can be used by the sensor for synchronizing sensors in time and frequency necessary for the TOA, TDOA and/or FDOA processing of radio signals.

Unlike GPS, which transmits information within its waveform for locating and synchronizing sensors, these techniques require a communications link for communication of such information from an external server. The overall result is a network of sensors that can determine their locations as well as synchronize to one another in time and frequency over a much greater range of environments including indoors.

Use of a location diversity scheme that includes both GNSS receivers and terrestrial broadcast receivers allows for fallback (where dual receivers operate as a primary and as a spare) and as hybrids where GNSS signaling is combined with terrestrial broadcast signaling. U.S. Pat. No. 6,917,328, "Radio Frequency Device for Receiving TV Signals and GPS Satellite Signals and Performing Positioning," Jul. 12, 2005, describes one such hybrid for positioning.

Once a location for the timing receiver is obtained via the diversity location receiver component of the Time and Frequency Synchronization Unit and any offsetting calibration is performed to position the sensor's receiving antenna and any timing reference signal delay is adjusted to mitigate the signal delays inherent in the timing receiver and cabling to the sensor (as described in U.S. patent application Ser. No. 11/948,244), the calculated location, frequency reference and adjusted timing signal may be used in the TOA or U-TDOA location estimation or to create an assistance message for the various mobile-based location technologies.

Illustrative Example

In a dense urban area, installations of sensors (also known as LMUs or PDEs) are problematic since structures prevent line of sight with the sky in many deployment areas. Since the LMUs typically share radio antenna and cabling with the BTS (or can be integrated into the BTS circuitry), site selection is done to optimize BTS coverage, not to ease LMU installation. Addition of the diversity location and timing source to overcome the expected failure of the GPS/GNSS receiver allows both LMU location to be automatically determined and timing reference signals to be obtained from the secondary terrestrial broadcast network. Automatic location determination could be used to automatically populate the LMU location database or to check or replace manually entered survey data for the LMU site. If a site has enough view of the GPS constellation to get good timing from the GPS receiver for even a small percentage of the day, this time could be used to determine the calibration factors of the digital TV signal so that the TV signal can be used when GPS is not available at that site. This does not account for drift in the TV signal when the receivers are not seeing GPS, but it would still enhance the timing receiver holdover performance.

Figure 11:
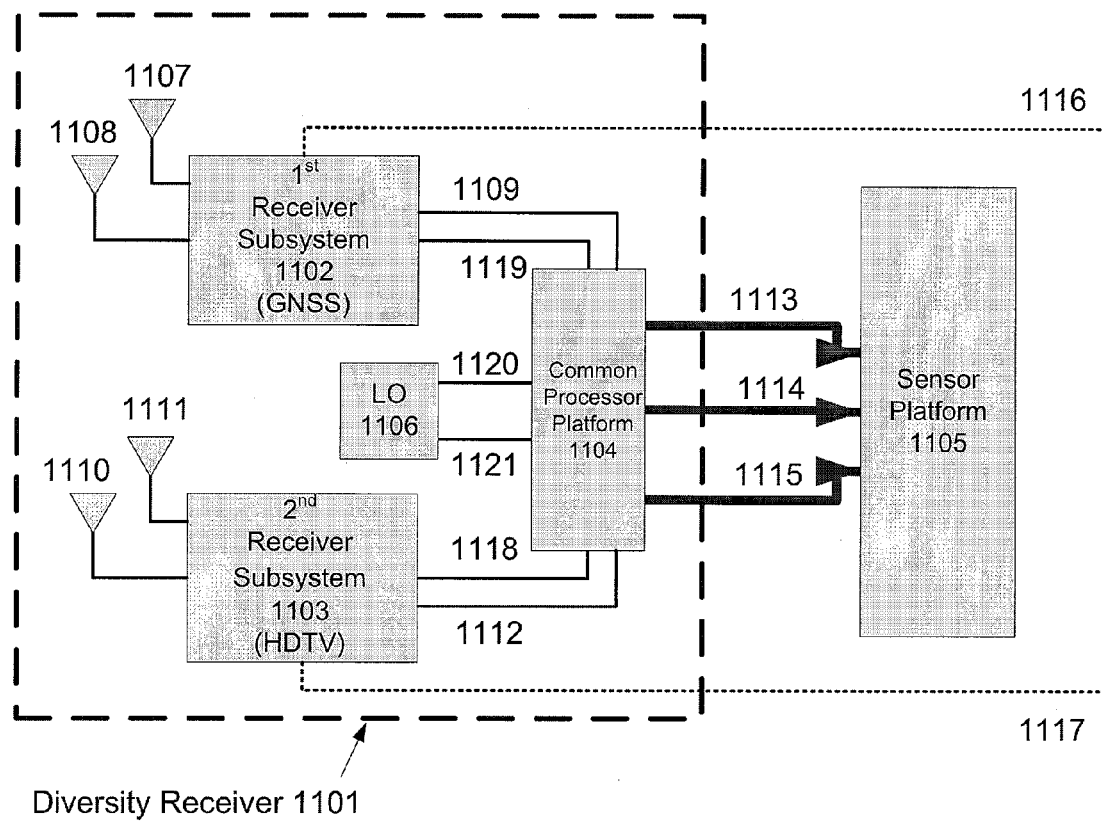
FIG. 11 schematically depicts the functional components of an illustrative embodiment of the location, timing and frequency diversity receiver and its interconnection with the sensor platform (LMU, PDE or SCS).

FIG. 11 schematically depicts the functional components of the location, Time and Frequency Synchronization Unit 1101 and its interconnection with the sensor platform 1105 (also known as an LMU, PDE or SCS). The diversity receiver 1101 comprises two or more receiver subsystems 1102 1103 which connect via digital data links 1109 1112 to a common processor platform 1104. In this example, receiver subsystems 1102 1103 are deemed primary 1102 and secondary 1103, but in practice, the common processor platform 1104 will designate the primary and secondary (or backup receiver) based on time-to-fix, signal quality, or operator preference. When the receivers 1102 1103 are used in a hybrid configuration, both receivers are primary.

The common processor platform interconnects to the sensor platform 1105 for the delivery of timing reference via a timing link 1113 (for example a 1 PPS signal), a frequency reference (nominally 10 MHz) via a frequency interface 1114 and delivery of timestamps and location data in the format of latitude, longitude, and altitude with error estimations via a data interconnection 1115.

In this example, the first receiver subsystem 1102 is a GNSS receiver. The GNSS receiver is equipped with a GPS antenna 1107 and may be optionally equipped with a second antenna 1108 for reception of a GNSS aiding signal. The aiding signal information, also known as correction information, includes satellite constellation orbital information, clock drift, atmosphere signal delay, and ionosphere delay. In some implementations of the aiding signaling, the GPS (or GNSS) antenna 1107 may be combined with the aiding signal antenna 1108.

The aiding signal information, also known as correction information, includes satellite constellation orbital information, clock drift, atmosphere signal delay, and ionosphere delay. In some wideband implementations of the aiding signaling, the GPS (or GNSS) antenna may be combined with the aiding signal antenna; otherwise separate antennas may be used.

GPS aiding radio signal systems include the Wide Area Augmentation System (WAAS) in the United States, the European Geostationary Navigation Overlay Service (EGNOS) in the European Union, the Multi-functional Satellite Augmentation System (MSAS) in Japan, the GPS Aided Geo Augmented Navigation (GAGAN) in India as well as various commercial differential GPS (D-GPS) systems such as the Starfire, Starfix, Quasi-Zenith, and OMNISTAR.

The WAAS is a functional example of a Satellite Based Augmentation System (SBAS) to the GPS (a prime example of a GNSS system). WAAS transmits signals from geostationary satellites that are similar to GPS signals and, therefore, can be processed by a multichannel GPS receiver to enhance the accuracy of a GPS receiver's location estimate as well as the time and frequency reference it provides when used in conjunction with GPS satellite signals. This greater accuracy occurs through the use of an over determined navigation solution in the GPS/WAAS receiver which provides an improvement in the accuracy as the number of GPS/WAAS signals processed by the multichannel receiver increases. If no GPS signals are available then the signals from just the WAAS can provide a time and frequency reference if the GPS/WAAS receiver is stationary and the three dimensional location of it is known. This is known as a "static timing mode" of operation. Hence, in this "static timing mode" timing reference redundancy is provided. This capability is especially useful in dense urban environments where a clear view of the sky is not available at the receive antenna location to receive a sufficient number of GPS satellites for good performance but a clear view of the WAAS satellites exists. Since the WAAS satellites are geostationary directional antennas may be for the aiding signal antenna 1108 used to further enhance the received signal level.

The first receiver subsystem 1102 may be optionally equipped with an aiding signal connection 1116, which provides the aiding information via a wired connection to a landside aiding server or network. The first receiver subsystem 1102 outputs to the CPP 1104 a stable time reference (nominally a 1 PPS signal) via interface 1119 and serial data stream over data link 1109 containing the calculated position and time-of-day.

In this example, the second receiver subsystem 1103 is a HDTV broadcast receiver. HDTV is used here to refer to the radio signal broadcasting and encoding protocols which include ATSC (Advanced Television Standards Committee) standard in the United States and several North American and Asian countries; DVB (Digital Video Broadcasting) standard in Europe, and ISDB (Integrated Services Digital Broadcasting) in Japan. The terrestrial broadcast receiver can include a mobile TV receiver for DVB-H or T-DMB, which can be used to provide synchronized timing.

The HDTV receiver 1103 is equipped with an antenna (or antenna array) 1110 and may be optionally equipped with a second antenna 1111 for reception of an aiding signal. In the case of an HDTV receiver, the aiding information would encompass broadcaster locations, channel assignments and timing characteristics and parameters.

The second receiver subsystem 1103 may be optionally equipped with an aiding signal connection 1117, which provides the aiding information via a wired connection to a landside aiding server or network. The second receiver subsystem 1103 outputs to the CPP 1104 a stable time reference (nominally a 1 PPS signal) via interface 1118 and serial data stream over data link 1112 containing the calculated position and time-of-day.

The common processor platform (CPP) 1104 is a software application running on purpose built high performance computer server hardware. The CPP 1104 both receives and sends data to the radio signal receiver subsystems 1102 1103 over duplex data links 1112 1109. The first and second receivers 1102 1103 deliver a common processor platform 104 a stable timing signal (nominally a 1 PPS timing signal) via first and second signaling interfaces 1118 1119 to the common processor platform 1104. The CPP 1104 uses the timing signal to discipline a reference oscillator 1106 via link 1120. The reference oscillator 1106 is nominally an Oven-Controlled Crystal Oscillator (OXCO) with phase lock loop (PPL) but can be a Rubidium or Cesium oscillator for longer hold-over times. The reference oscillator 1106 outputs to the CPP 1104 via link 1121 a stable frequency reference (nominally a 10 MHz sine wave).

Using time, frequency reference and timestamp information and developed error estimations, the common processor platform 1104 either selects the best receiver or hybridizes (using for example, Kalman filtering) the incoming information to create an optimized time, frequency reference and timestamp. The common processor platform 1104 utilizes separate feeds to the sensor 1105 for each type of information. The first interface 1113 is used to deliver the timing pulse, while the second interface 1114 is used for delivery of the frequency reference signal; and a third interface 1115 delivers the timestamp information, receiver location and location error parameters.

Alternative Embodiment

Using the Time and Frequency Synchronization Unit to provide diversity timing and location reception in wide area sensor deployments, a cost savings may be achieved. Using a subset of the total sensor population equipped with the diversity timing and location receiver module, the rest of the sensors (especially those mounted indoors or in areas where GPS/GNSS coverage is intermittent or non-existent) can use only the HTDV receiver subsystem for calculation of sensor location, timing and frequency reference.

Figure 12:
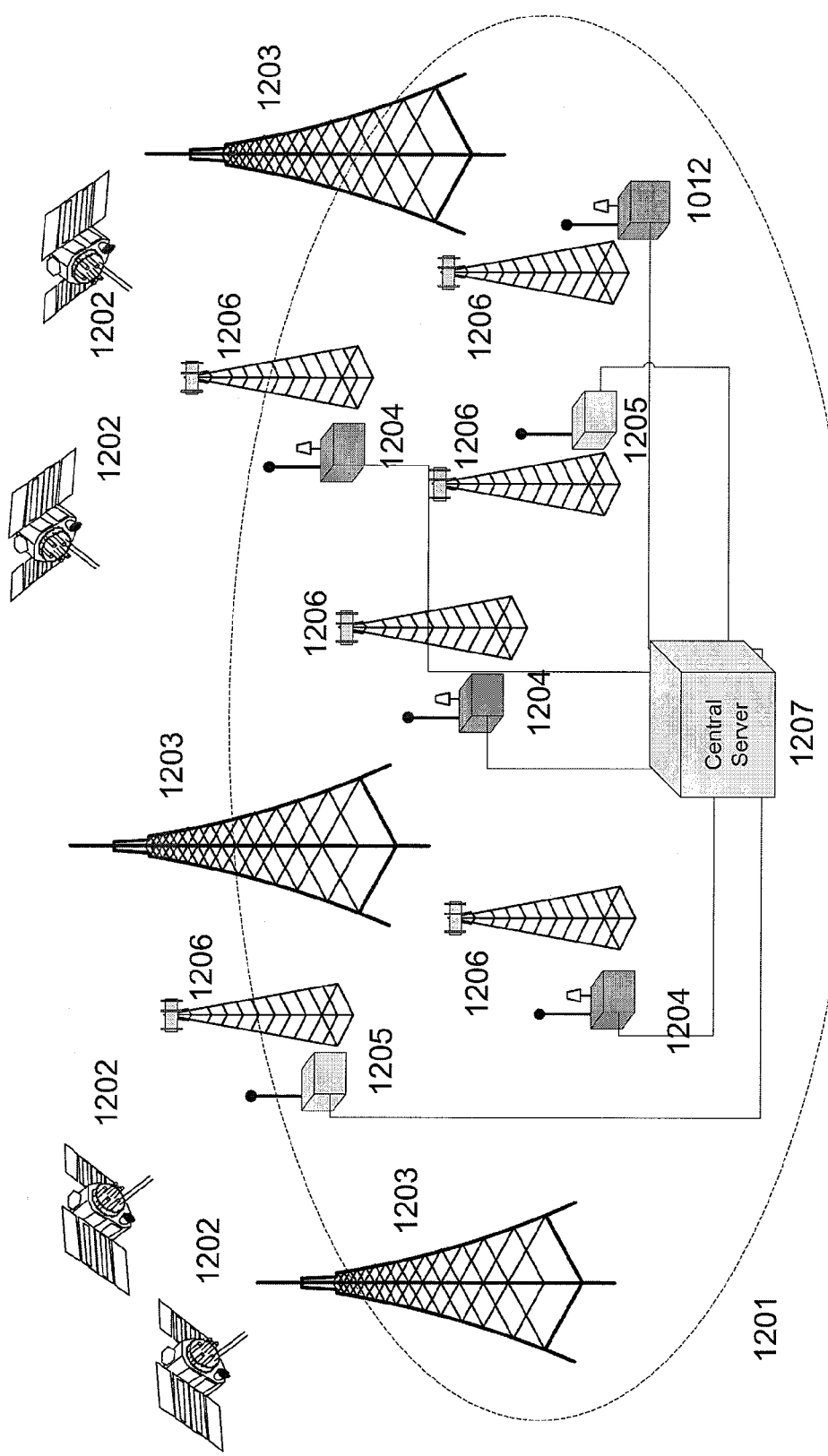
FIG. 12 illustrates a population of sensors deployed over a service area.

As shown in FIG. 12, a population of sensors 1204 1205 is deployed over a service area 1201. These sensors are generally co-located with existing radio system antenna 1206 such as cellular towers, but may be deployed as standalone units.

A subset 1205 of the total sensor population is mounted in GPS/GNSS challenged areas or not equipped with GNSS receivers. This subset of sensors 1205 are equipped only with terrestrial broadcast (e.g. HTDV) receiver subsystems for generation of location, timing and frequency reference. The GNSS satellites 1202 provide one set of timing signals for timing, frequency reference generation and receiver location, while the terrestrial broadcast system towers 1203 provide a second set of signals from which timing, frequency reference generation and receiver location can be determined.

The sub-population of sensors 1204 enhanced with diversity timing and location receiver modules generate an optimal sensor location, timing and frequency reference for said sensors. In addition, these enhanced (e.g. equipped with GPS and HDTV diversity timing and location receivers) sensors 1204 serve to supply signaling to central server 1207 and then to the non-enhanced or signal-lacking sensors 1205.

To enable location diversity fallback in LMU UTDOA, AOA, or hybrid (UTDOA/AoA, UTDOA/A-GPS, etc) receivers, or to enable lower cost LMU installations with a terrestrial broadcast receiver but without a GNSS receiver, the ability of multiple geographically distributed sensors to collect both GNSS and terrestrial broadcast timing signals and then send the signals to the centralized SMLC 1207 for analysis and forwarding is used.

Figure 13:
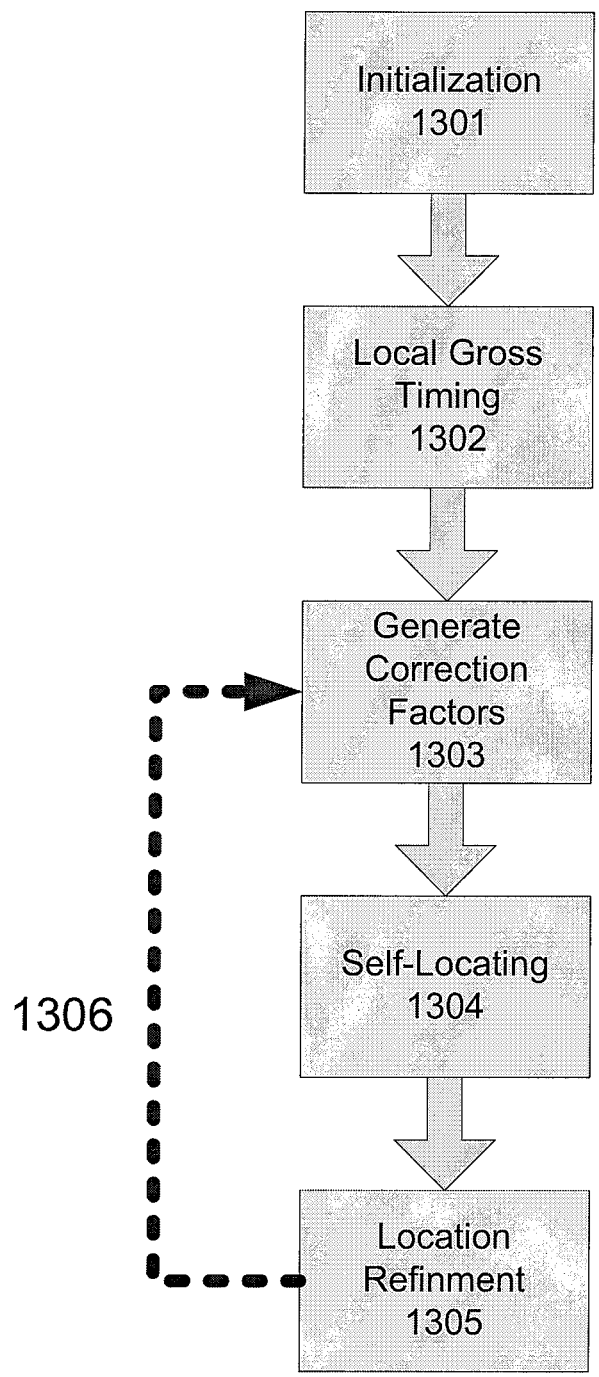
FIG. 13 illustrates an exemplary method to solve the problem of determining accurate locations for LMU's that do not have access to GPS signals but do have the ability to receive multiple terrestrial broadcasts (e.g., HDTV signals) from geographically diverse directions.

FIG. 13 shows an exemplary method to solve the problem of determining accurate locations for LMU's that do not have access to GPS signals, but do have the ability to receive multiple terrestrial broadcasts (e.g. HDTV signals) from geographically diverse directions.

The first step 1301 is initialization of the diversity time, location and frequency reference receiver subsystem. If timing cannot be acquired via the GNSS receiver subsystem (or if the LMU platform does not have a GNSS receiver subsystem installed), then this the alternative time, location and frequency reference procedure is entered. In the second step 1302 gross timing is acquired via the LMU's backhaul. This initial timing only needs to be accurate to within<10 ms of International Atomic Time (IAT). Network timing derived from the digital land transport (e.g., T1/E1 or Ethernet) is sufficiently accurate. This gross timing will be used in the acquisition of the fine timing from a visible terrestrial broadcasts transmitter.

The third step 1303 is to acquire correction factors for terrestrial signals from the central server (nominally the SMLC serves as a timing server in a Wireless Location System). The correction factors are obtained from the LMUs equipped with both GNSS and terrestrial broadcasts signal receivers. In step 1303, all or selected LMUs with visibility to both GNSS and terrestrial broadcasts signals are used to determine offsets in timing from several terrestrial broadcasts signals. These offsets, in addition to information about the exact locations of the reporting LMUs and the terrestrial broadcasts signal transmitters, allows for calculation of timing correction factors. The computed timing offsets and identities of the signal broadcasters are forwarded to the central server for storage and forwarding to other LMUs.

In the next step 1304, the population of LMUs without access to GNSS signaling (including those deployed without a GNSS receiver) requests timing offsets and transmitter locations for each LMU from the central server for all visible (to each LMU) terrestrial broadcasts transmitters. Each of the set of LMUs then performs a signal collection and constrained least squares location calculation using the terrestrial broadcast signals, forwarded transmitter locations and the forwarded timing corrections to self locate.

In the next step 1305, the LMUs without GNSS signal access insert the terrestrial broadcast derived location result into an averaging function. If the averaging function adjustment per location (convergence) is within the tolerance required, then the LMU stores its calculated location. If the location is not within tolerance, then an iterative process of additional timing and calculation of timing offset information is begun 1306.

Another potential approach to the recursive operation, started in step 1306, would be to for LMUs lacking GNSS visibility to perform 1 terrestrial broadcast signal acquisition per transmitter per second for 1 hour, compute the LMU location using the forwarded correction factors, and take the averaged result. The will yield 3600 samples and a very accurate location. Acquiring assistance data every 5 minutes during this process should be sufficient. Once in timing mode, acquiring correction factors as assistance data every 30 minutes should be sufficient to maintain accurate timing.

CONCLUSION

Any of the above mentioned aspects can be implemented in methods, systems, computer readable media, or any type of manufacture. The term circuitry used through the disclosure can include specialized hardware components. In the same or other embodiments circuitry can include microprocessors configured to perform function(s) by firmware or switches. In the same or other example embodiments circuitry can include one or more general purpose processing units and/or multi-core processing units, etc., that can be configured when software instructions that embody logic operable to perform function(s) are loaded into memory, e.g., RAM and/or virtual memory. In example embodiments where circuitry includes a combination of hardware and software, an implementer may write source code embodying logic and the source code can be compiled into machine readable code that can be processed by the general purpose processing unit(s).

Figure 10:
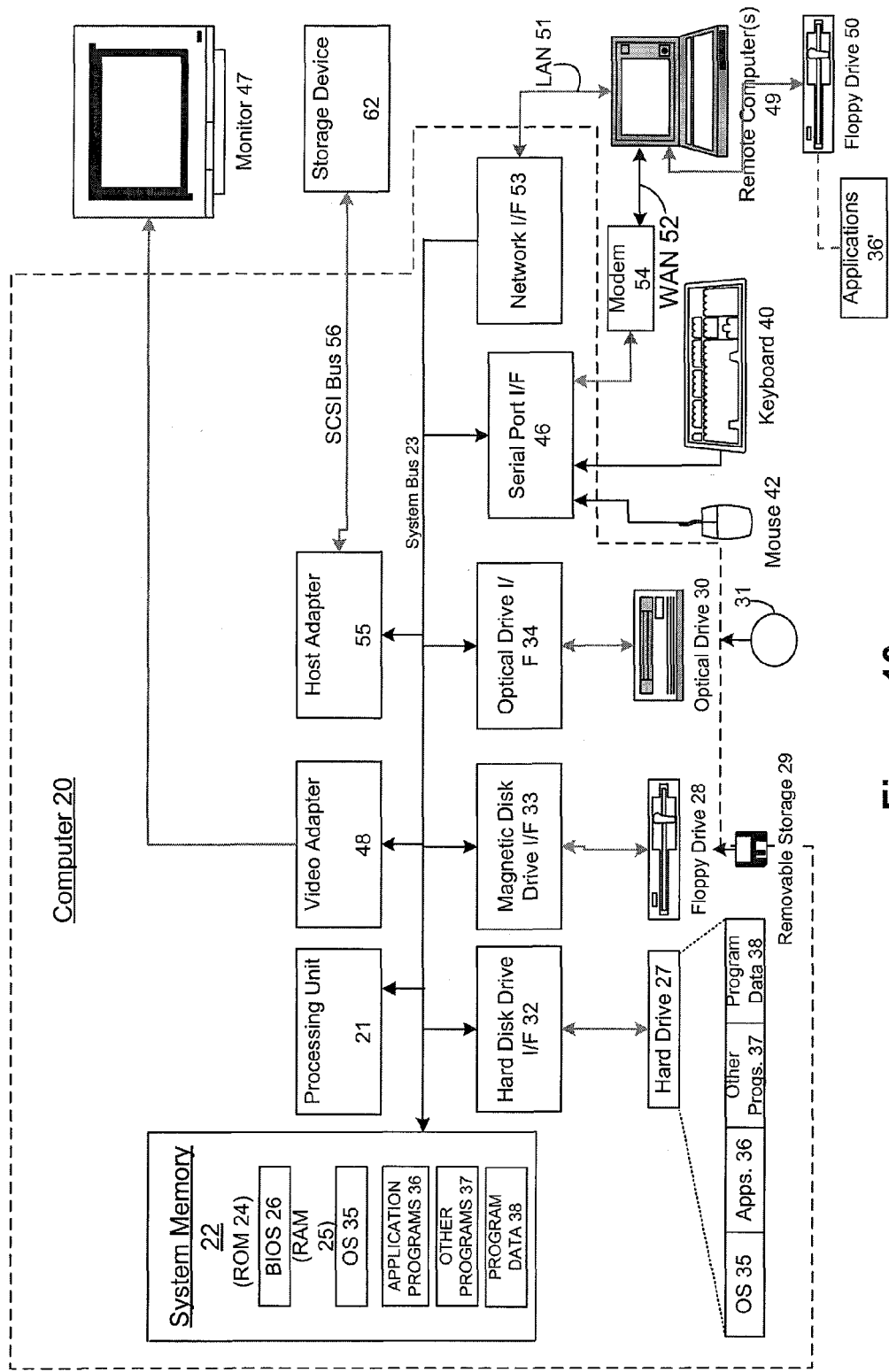
FIG. 10 depicts an example of a computing system which may be configured to implement aspects of FIGS. 1-9b.

FIG. 10 depicts an example of a computing system which is configured to with aspects of the invention. The computing system can include a computer 1020 or the like, including a processing unit 1021, a system memory 1022, and a system bus 1023 that couples various system components including the system memory to the processing unit 1021. The system bus 1023 may be any of several types of bus structures including a memory bus or memory controller, a peripheral bus, and a local bus using any of a variety of bus architectures. The system memory includes read only memory (ROM) 1024 and random access memory (RAM) 1025. A basic input/output system 1026 (BIOS), containing the basic routines that help to transfer information between elements within the computer 1020, such as during start up, is stored in ROM 1024. The computer 1020 may further include a hard disk drive 1027 for reading from and writing to a hard disk, not shown, a magnetic disk drive 1028 for reading from or writing to a removable magnetic disk 1029, and an optical disk drive 1030 for reading from or writing to a removable optical disk 1031 such as a CD ROM or other optical media. In some example embodiments, computer executable instructions embodying aspects of the invention may be stored in ROM 1024, hard disk (not shown), RAM 1025, removable magnetic disk 1029, optical disk 1031, and/or a cache of processing unit 1021. The hard disk drive 1027, magnetic disk drive 1028, and optical disk drive 1030 are connected to the system bus 1023 by a hard disk drive interface 1032, a magnetic disk drive interface 1033, and an optical drive interface 1034, respectively. The drives and their associated computer readable media provide nonvolatile storage of computer readable instructions, data structures, program modules and other data for the computer 1020. Although the environment described herein employs a hard disk, a removable magnetic disk 1029 and a removable optical disk 1031, it should be appreciated by those skilled in the art that other types of computer readable media which can store data that is accessible by a computer, such as magnetic cassettes, flash memory cards, digital video disks, Bernoulli cartridges, random access memories (RAM), read only memories (ROM) and the like may also be used in the operating environment.

A number of program modules may be stored on the hard disk, magnetic disk 1029, optical disk 1031, ROM 1024 or RAM 1025, including an operating system 1035, one or more application programs 1036, other program modules 1037 and program data 1038. A user may enter commands and information into the computer 1020 through input devices such as a keyboard 1040 and pointing device 1042. Other input devices (not shown) may include a microphone, joystick, game pad, satellite disk, scanner or the like. These and other input devices are often connected to the processing unit 1021 through a serial port interface 1046 that is coupled to the system bus, but may be connected by other interfaces, such as a parallel port, game port or universal serial bus (USB). A display 1047 or other type of display device can also be connected to the system bus 1023 via an interface, such as a video adapter 1048 and cable 1057. In addition to the display 1047, computers typically include other peripheral output devices (not shown), such as speakers and printers. The system of FIG. 10 also includes a host adapter 1055, Small Computer System Interface (SCSI) bus 1056, and an external storage device 1062 connected to the SCSI bus 1056.

The computer 1020 may operate in a networked environment using logical connections to one or more remote computers, such as a remote computer 1049. The remote computer 1049 may be another computer, a server, a router, a network PC, a peer device or other common network node, a virtual machine, and typically can include many or all of the elements described above relative to the computer 1020, although only a memory storage device 1050 has been illustrated in FIG. 10. The logical connections depicted in FIG. 10 can include a local area network (LAN) 1051 and a wide area network (WAN) 1052. Such networking environments are commonplace in offices, enterprise wide computer networks, intranets and the Internet.

When used in a LAN networking environment, the computer 1020 can be connected to the LAN 1051 through a network interface or adapter 1053. When used in a WAN networking environment, the computer 1020 can typically include a modem 1054 or other means for establishing communications over the wide area network 1052, such as the Internet. The modem 1054, which may be internal or external, can be connected to the system bus 1023 via the serial port interface 1046. In a networked environment, program modules depicted relative to the computer 1020, or portions thereof, may be stored in the remote memory storage device. It will be appreciated that the network connections shown are examples and other means of establishing a communications link between the computers may be used. Moreover, while it is envisioned that numerous embodiments of the invention are particularly well-suited for computer systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof While particular aspects and embodiments of the invention described herein have been shown and described, it will be apparent to those skilled in the art that, based upon the teachings herein, changes and modifications may be made and, therefore, the appended claims are to encompass within their scope all such changes and modifications as are within the true spirit and scope of the inventions described herein.

We claim:

1. A diversity receiver, comprising:
    a first receiver subsystem comprising a terrestrial broadcast receiver;
    a common processor platform (CPP) coupled via first link means to the first receiver subsystem, wherein the first receiver subsystem provides a stable time reference and position information to the CPP via the first link means;
    second link means for coupling the diversity receiver to a sensor platform of a wireless location system (WLS) and providing time and frequency references and location data to said sensor platform;
    a second receiver subsystem comprising a GNSS receiver operatively coupled via third link means to said CPP; and
    a reference oscillator operatively coupled to the CPP, wherein the CPP is configured to discipline the reference oscillator and the reference oscillator is configured to provide a stable frequency reference to the CPP;
    wherein the time and frequency references provided via the second link means are usable to synchronize the sensor platform with other sensor platforms of the WLS.

2. A diversity receiver as recited in claim 1, wherein said terrestrial broadcast receiver comprises an HDTV receiver.

3. A diversity receiver as recited in claim 1, wherein said terrestrial broadcast receiver comprises an antenna for receiving an aiding signal communicating aiding information including broadcaster locations, channel assignments and timing characteristics and parameters.

4. A diversity receiver as recited in claim 1, wherein said terrestrial broadcast receiver comprises an aiding information interface for receiving aiding information including broadcaster locations, channel assignments and timing characteristics and parameters.

5. A diversity receiver as recited in claim 4, wherein the aiding information interface is configured to couple the terrestrial broadcast receiver to a landside aiding server or network.

6. A diversity receiver as recited in claim 1, wherein the second receiver subsystem provides a second stable time reference and position information to the CPP via the third link means.

7. A diversity receiver as recited in claim 1, wherein the GNSS receiver comprises an aiding information interface for reception of a GNSS aiding signal, said aiding signal communicating satellite constellation orbital information and other information used to correct for clock drift, atmosphere signal delay, and ionosphere delay, whereby the accuracy of a GNSS receiver's location estimate and the time and frequency references can be enhanced.

8. A diversity receiver as recited in claim 6, wherein the GNSS receiver comprises an aiding information interface for receiving aiding information from a landside aiding server or network.

9. A diversity receiver as recited in claim 7 or claim 8, wherein the GNSS receiver is configured to operate in a static timing mode in which a time and frequency reference are provided when no GNSS signals are available.

10. A diversity receiver as recited in claim 1, wherein the CPP is configured to designate a primary and secondary receiver subsystem based on time-to-fix, signal quality, or operator preference.

11. A diversity receiver as recited in claim 1, wherein the CPP is configured to communicate via said first and third link means with the first and second receiver subsystems, to receive stable time signals from the receiver subsystems, and to use at least one of the time signals to discipline the reference oscillator.

12. A diversity receiver as recited in claim 11, wherein the CPP is further configured either to select one of the first and second receiver subsystems or to hybridize the information provided by the receiver subsystems to create an optimized time reference, frequency reference and timestamp to be provided to the sensor platform.

13. A first location sensor for use in a wireless location system (WLS) comprising a network of location sensors, said first location sensor comprising:
    a first receiver subsystem comprising an HDTV receiver;
    a common processor platform (CPP) coupled via first link means to the first receiver subsystem, wherein the first receiver subsystem provides a stable time reference and position information to the CPP via the first link means;
    second link means for coupling the first location sensor to a sensor platform and providing time and frequency references and location data to said sensor platform;
    a second receiver subsystem comprising a GNSS receiver operatively coupled via third link means to said CPP, wherein the second receiver subsystem provides a second stable time reference and position information to the CPP via the third link means; and
    a reference oscillator operatively coupled to the CPP;
    wherein the CPP is configured to communicate via said first and third link means with the first and second receiver subsystems, to receive stable time signals from the receiver subsystems, and to use at least one of the time signals to discipline the reference oscillator, and wherein said reference oscillator provides a stable frequency reference to the CPP.

14. A first location sensor as recited in claim 13, wherein said HDTV receiver comprises an antenna for receiving an aiding signal communicating aiding information including broadcaster locations, channel assignments and timing characteristics and parameters.

15. A first location sensor as recited in claim 13, wherein said HDTV receiver comprises an aiding information interface for receiving aiding information including broadcaster locations, channel assignments and timing characteristics and parameters.

16. A first location sensor as recited in claim 15, wherein the aiding information interface is configured to couple the HDTV receiver to a landside aiding server or network.

17. A first location sensor as recited in claim 13, wherein the GNSS receiver comprises an aiding information interface for reception of a GNSS aiding signal, said aiding signal communicating satellite constellation orbital information and other information used to correct for clock drift, atmosphere signal delay, and ionosphere delay, whereby the accuracy of a GNSS receiver's location estimate and the time and frequency references can be enhanced.

18. A first location sensor as recited in claim 13, wherein the GNSS receiver comprises an aiding information interface for receiving aiding information from a landside aiding server or network.

19. A first location sensor as recited in claim 17 or claim 18, wherein the GNSS receiver is configured to operate in a static timing mode in which a time and frequency reference are provided when no GNSS signals are available.

20. A first location sensor as recited in claim 13, wherein the CPP is configured to designate a primary and secondary receiver subsystem based on time-to-fix, signal quality, or operator preference.

21. A first location sensor as recited in claim 13, wherein the CPP is further configured either to select one of the first and second receiver subsystems or to hybridize the information provided by the receiver subsystems to create an optimized time reference, frequency reference and timestamp to be provided to the sensor platform.

* * * * *